(12) United States Patent
Adib et al.

(10) Patent No.: US 12,344,548 B2
(45) Date of Patent: Jul. 1, 2025

(54) METHODS FOR MAKING CONTROLLABLY BONDED SHEETS

(71) Applicant: Corning Incorporated, Corning, NY (US)

(72) Inventors: Kaveh Adib, Corning, NY (US); Robert Alan Bellman, Ithaca, NY (US); Jiangwei Feng, Ithaca, NY (US); Georgiy M Guryanov, Boca Raton, FL (US); Jhih-Wei Liang, Toufen (TW); Shiwen Liu, Painted Post, NY (US); Prantik Mazumder, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 119 days.

(21) Appl. No.: 17/989,075

(22) Filed: Nov. 17, 2022

(65) Prior Publication Data

US 2023/0091841 A1 Mar. 23, 2023

Related U.S. Application Data

(62) Division of application No. 16/327,145, filed as application No. PCT/US2017/049025 on Aug. 29, 2017, now Pat. No. 11,535,553.

(Continued)

(51) Int. Cl.
*C03C 17/32* (2006.01)
*B32B 7/06* (2019.01)
(Continued)

(52) U.S. Cl.
CPC .............. *C03C 17/328* (2013.01); *B32B 7/06* (2013.01); *B32B 15/04* (2013.01); *B32B 17/06* (2013.01);
(Continued)

(58) Field of Classification Search
None
See application file for complete search history.

(56) References Cited

U.S. PATENT DOCUMENTS

| | | |
|---|---|---|
| 3,722,181 A | 3/1973 | Kirkland et al. |
| 4,096,315 A | 6/1978 | Kubacki |
| | (Continued) | |

FOREIGN PATENT DOCUMENTS

| | | |
|---|---|---|
| BE | 606948 A | 12/1961 |
| CN | 101484988 A | 7/2009 |
| | (Continued) | |

OTHER PUBLICATIONS

2014 Gelest Brochure—Silane Coupling Agents Connecting Across Boundaries.

(Continued)

*Primary Examiner* — Barbara J Musser
(74) *Attorney, Agent, or Firm* — Kevin M. Able; Russell S. Magaziner

(57) ABSTRACT

Described herein are articles and methods of making articles, including a first sheet and a second sheet, wherein the thin sheet and carrier are bonded together using a coating layer, preferably a hydrocarbon polymer coating layer, and associated deposition methods and inert gas treatments that may be applied on either sheet, or both, to control van der Waals, hydrogen and covalent bonding between the sheets. The coating layer bonds the sheets together to prevent formation of a permanent bond at high temperature processing while at the same time maintaining a sufficient bond to prevent delamination during high temperature processing.

10 Claims, 8 Drawing Sheets

Related U.S. Application Data

(60) Provisional application No. 62/381,731, filed on Aug. 31, 2016.

(51) Int. Cl.
   *B32B 15/04* (2006.01)
   *B32B 17/06* (2006.01)
   *B32B 17/10* (2006.01)
   *C03C 17/28* (2006.01)

(52) U.S. Cl.
   CPC .... *B32B 17/10036* (2013.01); *B32B 17/1055* (2013.01); *B32B 17/10899* (2013.01); *C03C 17/28* (2013.01); *B32B 2457/20* (2013.01); *C03C 2218/153* (2013.01)

(56) References Cited

U.S. PATENT DOCUMENTS

| | | |
|---|---|---|
| 4,179,324 A | 12/1979 | Kirkpatrick |
| 4,293,585 A | 10/1981 | Imada et al. |
| 4,397,722 A | 8/1983 | Haller |
| 4,599,243 A | 7/1986 | Sachdev et al. |
| 4,599,266 A | 7/1986 | Nakayama et al. |
| 4,810,326 A | 3/1989 | Babu et al. |
| 4,822,466 A | 4/1989 | Rabalais et al. |
| 4,849,284 A | 7/1989 | Arthur et al. |
| 4,990,462 A | 2/1991 | Sliwa, Jr. |
| 5,073,181 A | 12/1991 | Foster et al. |
| 5,141,800 A | 8/1992 | Effenberger et al. |
| 5,143,747 A | 9/1992 | Matossian et al. |
| 5,222,494 A | 6/1993 | Baker, Jr. |
| 5,357,726 A | 10/1994 | Effenberger et al. |
| 5,413,940 A | 5/1995 | Lin et al. |
| 5,461,934 A | 10/1995 | Budd |
| 5,462,781 A | 10/1995 | Zukowski |
| 5,479,043 A | 12/1995 | Nuyen |
| 5,482,896 A | 1/1996 | Tang |
| 5,491,571 A | 2/1996 | Williams et al. |
| 5,554,680 A | 9/1996 | Ojakaar |
| 5,616,179 A | 4/1997 | Baldwin et al. |
| 5,661,618 A | 8/1997 | Brown et al. |
| 5,718,967 A | 2/1998 | Hu et al. |
| 5,755,867 A | 5/1998 | Chikuni et al. |
| 5,820,991 A | 10/1998 | Cabo |
| 5,840,616 A | 11/1998 | Sakaguchi et al. |
| 5,888,591 A | 3/1999 | Gleason et al. |
| 5,904,791 A | 5/1999 | Bearinger et al. |
| 5,966,622 A | 10/1999 | Levine et al. |
| 5,972,152 A | 10/1999 | Lake et al. |
| 6,037,026 A | 3/2000 | Iwamoto |
| 6,091,478 A | 7/2000 | Tanaka et al. |
| 6,124,154 A | 9/2000 | Miyasaka |
| 6,159,385 A | 12/2000 | Yao et al. |
| 6,261,398 B1 | 7/2001 | Costa |
| 6,338,901 B1 | 1/2002 | Veerasamy |
| 6,379,746 B1 | 4/2002 | Birch et al. |
| 6,387,736 B1 | 5/2002 | Cao et al. |
| 6,521,511 B1 | 2/2003 | Inoue et al. |
| 6,521,857 B1 | 2/2003 | Barnett |
| 6,528,145 B1 | 3/2003 | Berger et al. |
| 6,540,866 B1 | 4/2003 | Zhang et al. |
| 6,602,606 B1 | 8/2003 | Fujisawa et al. |
| 6,645,828 B1 | 11/2003 | Farrens et al. |
| 6,649,540 B2 | 11/2003 | Wang et al. |
| 6,687,969 B1 | 2/2004 | Dando |
| 6,699,798 B2 | 3/2004 | Rockford |
| 6,735,982 B2 | 5/2004 | Matthies |
| 6,762,074 B1 | 7/2004 | Draney et al. |
| 6,814,833 B2 | 11/2004 | Sabia |
| 6,815,070 B1 | 11/2004 | Buerkle et al. |
| 6,969,166 B2 | 11/2005 | Clark et al. |
| 6,974,731 B2 | 12/2005 | Yamazaki et al. |
| 6,992,371 B2 | 1/2006 | Mancini et al. |
| 7,041,608 B2 | 5/2006 | Sieber et al. |
| 7,045,878 B2 | 5/2006 | Faris |
| 7,056,751 B2 | 6/2006 | Faris |
| 7,060,323 B2 | 6/2006 | Sugahara et al. |
| 7,118,990 B1 | 10/2006 | Xu et al. |
| 7,129,311 B2 | 10/2006 | Teff et al. |
| 7,144,638 B2 | 12/2006 | Leung et al. |
| 7,147,740 B2 | 12/2006 | Takayama et al. |
| 7,166,520 B1 | 1/2007 | Henley |
| 7,220,656 B2 | 5/2007 | Forbes |
| 7,232,739 B2 | 6/2007 | Kerdiles et al. |
| 7,261,793 B2 | 8/2007 | Chen et al. |
| 7,351,300 B2 | 4/2008 | Takayama et al. |
| 7,364,942 B2 | 4/2008 | Martin |
| 7,407,867 B2 | 8/2008 | Ghyselen et al. |
| 7,408,006 B2 | 8/2008 | Comino et al. |
| 7,466,390 B2 | 12/2008 | French et al. |
| 7,482,249 B2 | 1/2009 | Jakob et al. |
| 7,531,590 B2 | 5/2009 | Teff et al. |
| 7,541,264 B2 | 6/2009 | Gardner et al. |
| 7,574,787 B2 | 8/2009 | Xu et al. |
| 7,575,983 B2 | 8/2009 | Hu et al. |
| 7,635,617 B2 | 12/2009 | Yamazaki |
| 7,642,559 B2 | 1/2010 | Yamazaki et al. |
| 7,737,035 B1 | 6/2010 | Lind et al. |
| 7,741,775 B2 | 6/2010 | Yamazaki et al. |
| 7,749,862 B2 | 7/2010 | Schwarzenbach et al. |
| 7,763,365 B2 | 7/2010 | Takeuchi et al. |
| 7,842,548 B2 | 11/2010 | Lee et al. |
| 7,902,038 B2 | 3/2011 | Aspar et al. |
| 7,909,928 B2 | 3/2011 | Lahann et al. |
| 7,939,425 B2 | 5/2011 | Hu et al. |
| 7,960,840 B2 | 6/2011 | Bonifield et al. |
| 7,960,916 B2 | 6/2011 | Kawachi |
| 7,978,282 B2 | 7/2011 | An et al. |
| 7,989,314 B2 | 8/2011 | Lee et al. |
| 8,012,667 B2 | 9/2011 | Nam et al. |
| 8,034,206 B2 | 10/2011 | Kim et al. |
| 8,034,452 B2 | 10/2011 | Padiyath et al. |
| 8,043,697 B2 | 10/2011 | Murakami et al. |
| 8,048,794 B2 | 11/2011 | Knickerbocker |
| 8,069,229 B2 | 11/2011 | Yellapragada et al. |
| 8,105,935 B2 | 1/2012 | Ohara et al. |
| 8,138,614 B2 | 3/2012 | Yamazaki et al. |
| 8,173,249 B2 | 5/2012 | Leu et al. |
| 8,211,259 B2 | 7/2012 | Sato et al. |
| 8,211,270 B2 | 7/2012 | Suzuki et al. |
| 8,236,669 B2 | 8/2012 | Hong et al. |
| 8,268,939 B2 | 9/2012 | Ebbrecht et al. |
| 8,349,727 B2 | 1/2013 | Guo et al. |
| 8,383,460 B1 | 2/2013 | Yim |
| 8,399,047 B2 | 3/2013 | Lahann et al. |
| 8,580,069 B2 | 11/2013 | Watanabe et al. |
| 8,590,688 B2 | 11/2013 | Weigl |
| 8,609,229 B2 | 12/2013 | Kondo |
| 8,656,735 B2 | 2/2014 | Tamitsuji et al. |
| 8,660,052 B2 | 2/2014 | Liang et al. |
| 8,697,228 B2 | 4/2014 | Carre et al. |
| 8,697,728 B2 | 4/2014 | Ashrafian et al. |
| 8,822,306 B2 | 9/2014 | Berger et al. |
| 8,840,999 B2 | 9/2014 | Harimoto et al. |
| 8,993,706 B2 | 3/2015 | Schubert et al. |
| 8,995,146 B2 | 3/2015 | Brooks et al. |
| 9,069,133 B2 | 6/2015 | Baldwin et al. |
| 9,111,981 B2 | 8/2015 | Flaim et al. |
| 9,131,587 B2 | 9/2015 | Zhou |
| 9,269,826 B2 | 2/2016 | Hosono et al. |
| 9,612,455 B2 | 4/2017 | Nicolson et al. |
| 9,805,941 B2 | 10/2017 | Kanarik et al. |
| 9,889,635 B2 | 2/2018 | Bellman et al. |
| 10,046,542 B2 | 8/2018 | Adib et al. |
| 10,086,584 B2 | 10/2018 | Bellman et al. |
| 10,543,662 B2 | 1/2020 | Bellman et al. |
| 2001/0045351 A1 | 11/2001 | Koh et al. |
| 2002/0171080 A1 | 11/2002 | Faris |
| 2003/0017303 A1 | 1/2003 | Shindo et al. |
| 2003/0020049 A1 | 1/2003 | Payne et al. |
| 2003/0020062 A1 | 1/2003 | Faris |
| 2003/0057563 A1 | 3/2003 | Nathan et al. |
| 2003/0119336 A1 | 6/2003 | Matsuki et al. |

(56) References Cited

U.S. PATENT DOCUMENTS

| | | |
|---|---|---|
| 2003/0175525 A1 | 9/2003 | Wochnowski et al. |
| 2003/0210853 A1 | 11/2003 | Kato |
| 2003/0228413 A1 | 12/2003 | Ohta et al. |
| 2004/0033358 A1 | 2/2004 | Coates et al. |
| 2004/0044100 A1 | 3/2004 | Schlenoff et al. |
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0248378 A1 | 12/2004 | Ghyselen et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chang |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0091104 A1 | 5/2006 | Takeshita et al. |
| 2006/0134362 A1 | 6/2006 | Lu et al. |
| 2006/0165975 A1 | 7/2006 | Moser et al. |
| 2006/0166464 A1 | 7/2006 | Jakob et al. |
| 2006/0172437 A1 | 8/2006 | Puijk |
| 2006/0188730 A1 | 8/2006 | Varanasi et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0090380 A1 | 4/2008 | Gardner et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2008/0309867 A1 | 12/2008 | Kampstra |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0218560 A1 | 9/2009 | Flaim et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0018505 A1 | 1/2010 | Ma et al. |
| 2010/0032625 A1 | 2/2010 | Kupsky et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Cheshire |
| 2010/0316871 A1 | 12/2010 | Fujiwara et al. |
| 2011/0001251 A1 | 1/2011 | Gou et al. |
| 2011/0002636 A1 | 1/2011 | Ando et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0052833 A1 | 3/2011 | Hanawa et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1 | 5/2011 | Carre et al. |
| 2011/0123787 A1 | 5/2011 | Tomamoto et al. |
| 2011/0170991 A1 | 7/2011 | Weigl |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | Mccutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park et al. |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0101674 A1 | 4/2013 | Toft |
| 2013/0115441 A1 | 5/2013 | Bookbinder et al. |
| 2013/0188324 A1 | 7/2013 | Lee et al. |
| 2013/0192574 A1 | 8/2013 | Maeda |
| 2013/0192754 A1 | 8/2013 | Dukkipati et al. |
| 2013/0203265 A1 | 8/2013 | Hsiao |
| 2013/0209731 A1 | 8/2013 | Nattermann et al. |
| 2013/0230265 A1 | 9/2013 | Hubbard et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0042662 A1 | 2/2014 | Tamada et al. |
| 2014/0050911 A1 | 2/2014 | Mauro et al. |
| 2014/0106141 A1 | 4/2014 | Bellman et al. |
| 2014/0106150 A1 | 4/2014 | Decker et al. |
| 2014/0130969 A1 | 5/2014 | Mccutcheon et al. |
| 2014/0150244 A1 | 6/2014 | Liu et al. |
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1 | 3/2015 | Ro et al. |
| 2015/0086794 A1 | 3/2015 | Akita et al. |
| 2015/0099110 A1 | 4/2015 | Bellman et al. |

(56) References Cited

U.S. PATENT DOCUMENTS

| | | | |
|---|---|---|---|
| 2015/0102498 | A1 | 4/2015 | Enicks et al. |
| 2015/0266276 | A1 | 9/2015 | Vissing et al. |
| 2015/0290887 | A1 | 10/2015 | Swier et al. |
| 2015/0306847 | A1 | 10/2015 | Bellman et al. |
| 2015/0329415 | A1 | 11/2015 | Bellman et al. |
| 2016/0009958 | A1 | 1/2016 | Moore et al. |
| 2016/0011109 | A1 | 1/2016 | Kim |
| 2016/0017196 | A1 | 1/2016 | Moore et al. |
| 2016/0024657 | A1 | 1/2016 | Sakamoto et al. |
| 2016/0035764 | A1 | 2/2016 | Watts |
| 2016/0059605 | A1 | 3/2016 | Schmidt et al. |
| 2016/0083835 | A1 | 3/2016 | Adib et al. |
| 2016/0211803 | A1 | 7/2016 | Ji et al. |
| 2016/0329415 | A1 | 11/2016 | He et al. |
| 2017/0036419 | A1 | 2/2017 | Adib et al. |
| 2017/0182744 | A1 | 6/2017 | Bellman et al. |
| 2017/0320771 | A1 | 11/2017 | Adib et al. |
| 2018/0126705 | A1 | 5/2018 | Adib et al. |
| 2018/0269071 | A1 | 9/2018 | Le et al. |
| 2018/0297324 | A1 | 10/2018 | Adib et al. |
| 2021/0261836 | A1 | 8/2021 | Bhattacharyya et al. |

FOREIGN PATENT DOCUMENTS

| | | |
|---|---|---|
| CN | 101688085 A | 3/2010 |
| CN | 101809110 A | 8/2010 |
| CN | 101916022 A | 12/2010 |
| CN | 101924067 A | 12/2010 |
| CN | 101970370 A | 2/2011 |
| CN | 102034746 A | 4/2011 |
| CN | 102070120 A | 5/2011 |
| CN | 102789125 A | 11/2012 |
| CN | 102815052 A | 12/2012 |
| CN | 102820262 A | 12/2012 |
| CN | 103025833 A | 4/2013 |
| CN | 103042803 A | 4/2013 |
| CN | 105102391 A | 11/2015 |
| CN | 105122501 A | 12/2015 |
| CN | 105683115 A | 6/2016 |
| DE | 10034737 A1 | 2/2002 |
| DE | 10323303 A1 | 4/2004 |
| DE | 10323304 A1 | 4/2004 |
| DE | 10353530 A1 | 6/2005 |
| EP | 0737258 A1 | 10/1996 |
| EP | 1127706 A1 | 8/2001 |
| EP | 1628339 A1 | 2/2006 |
| EP | 1914066 A1 | 4/2008 |
| EP | 2025650 A1 | 2/2009 |
| EP | 2128105 A1 | 12/2009 |
| EP | 2270865 A2 | 1/2011 |
| EP | 2273475 A1 | 1/2011 |
| EP | 2398040 A1 | 12/2011 |
| EP | 2331436 B1 | 12/2012 |
| EP | 2797724 A1 | 11/2014 |
| FR | 2531235 A1 | 2/1984 |
| FR | 2893750 A1 | 5/2007 |
| GB | 0952609 A | 3/1964 |
| GB | 0993314 A | 5/1965 |
| GB | 1082116 A | 9/1967 |
| GB | 1373359 A | 11/1974 |
| GB | 1373559 A | 11/1974 |
| GB | 1583544 A | 1/1981 |
| GB | 2107930 A | 5/1983 |
| GB | 2481187 A | 12/2011 |
| IN | 200906585 | 5/2015 |
| JP | 05-096235 A | 4/1993 |
| JP | 05-111620 A | 5/1993 |
| JP | 09-012343 A | 1/1997 |
| JP | 2000-096488 A | 4/2000 |
| JP | 2000-241804 A | 9/2000 |
| JP | 2002-348150 A | 12/2002 |
| JP | 2003-071937 A | 3/2003 |
| JP | 2003-077187 A | 3/2003 |
| JP | 2004-066664 A | 3/2004 |
| JP | 2004-508532 A | 3/2004 |
| JP | 2004-178891 A | 6/2004 |
| JP | 2005-014599 A | 1/2005 |
| JP | 2005-300972 A | 10/2005 |
| JP | 2006-003684 A | 1/2006 |
| JP | 2007-138144 A | 6/2007 |
| JP | 4036018 B2 | 1/2008 |
| JP | 2008-072087 A | 3/2008 |
| JP | 2008-123948 A | 5/2008 |
| JP | 2009-028922 A | 2/2009 |
| JP | 2009-028923 A | 2/2009 |
| JP | 2009-035720 A | 2/2009 |
| JP | 2009-074002 A | 4/2009 |
| JP | 2009-131732 A | 6/2009 |
| JP | 2009-184172 A | 8/2009 |
| JP | 2009-283155 A | 12/2009 |
| JP | 2009-298916 A | 12/2009 |
| JP | 2010-018505 A | 1/2010 |
| JP | 2010-167484 A | 8/2010 |
| JP | 2010-248011 A | 11/2010 |
| JP | 4625913 B2 | 2/2011 |
| JP | 2011-048979 A | 3/2011 |
| JP | 2011-058579 A | 3/2011 |
| JP | 2011-159697 A | 8/2011 |
| JP | 2011-201976 A | 10/2011 |
| JP | 2011-201977 A | 10/2011 |
| JP | 2011-235532 A | 11/2011 |
| JP | 2011-235556 A | 11/2011 |
| JP | 2011-236349 A | 11/2011 |
| JP | 2011-248011 A | 12/2011 |
| JP | 2012-030424 A | 2/2012 |
| JP | 2012-035532 A | 2/2012 |
| JP | 2012-119611 A | 6/2012 |
| JP | 2012-166999 A | 9/2012 |
| JP | 2012-209545 A | 10/2012 |
| JP | 5057657 B2 | 10/2012 |
| JP | 2012-212939 A | 11/2012 |
| JP | 2012-227310 A | 11/2012 |
| JP | 2012-248011 A | 12/2012 |
| JP | 2013-010340 A | 1/2013 |
| JP | 2013-010342 A | 1/2013 |
| JP | 5111620 B2 | 1/2013 |
| JP | 2013-184346 A | 9/2013 |
| JP | 2013-184872 A | 9/2013 |
| JP | 2013-207084 A | 10/2013 |
| JP | 2013-224475 A | 10/2013 |
| JP | 2014-019597 A | 2/2014 |
| JP | 2015-093405 A | 5/2015 |
| JP | 2015-093795 A | 5/2015 |
| JP | 2015-116694 A | 6/2015 |
| JP | 2015-209471 A | 11/2015 |
| JP | 2016-064862 A | 4/2016 |
| JP | 2016-106047 A | 6/2016 |
| JP | 2017-500259 A | 1/2017 |
| JP | 2017-500753 A | 1/2017 |
| JP | 2017-506170 A | 3/2017 |
| JP | 2017-078170 A | 4/2017 |
| JP | 2017-511756 A | 4/2017 |
| JP | 2017-087417 A | 5/2017 |
| KR | 92-0016160 A | 9/1992 |
| KR | 10-2008-0096372 A | 10/2008 |
| KR | 10-2008-0111094 A | 12/2008 |
| KR | 10-2008-0113576 A | 12/2008 |
| KR | 10-2009-0114195 A | 11/2009 |
| KR | 10-2010-0051499 A | 5/2010 |
| KR | 10-2010-0057521 A | 5/2010 |
| KR | 10-2010-0112628 A | 10/2010 |
| KR | 10-1002936 B1 | 12/2010 |
| KR | 10-2011-0033284 A | 3/2011 |
| KR | 10-2011-0043376 A | 4/2011 |
| KR | 2011-0045136 A | 5/2011 |
| KR | 10-2011-0068352 A | 6/2011 |
| KR | 10-1073032 B1 | 10/2011 |
| KR | 10-2011-0134708 A | 12/2011 |
| KR | 10-2012-0023063 A | 3/2012 |
| KR | 10-2012-0031698 A | 4/2012 |
| KR | 10-2012-0033284 A | 4/2012 |
| KR | 10-2012-0056227 A | 6/2012 |
| KR | 10-2012-0057346 A | 6/2012 |
| KR | 10-2012-0064676 A | 6/2012 |

(56) References Cited

FOREIGN PATENT DOCUMENTS

| | | |
|---|---|---|
| KR | 10-2012-0069608 A | 6/2012 |
| KR | 10-1164945 B1 | 7/2012 |
| KR | 10-2012-0098640 A | 9/2012 |
| KR | 10-2012-0100274 A | 9/2012 |
| KR | 2013-0003997 A | 1/2013 |
| KR | 10-2013-0044774 A | 5/2013 |
| KR | 10-2013-0095605 A | 8/2013 |
| KR | 10-2013-0104534 A | 9/2013 |
| KR | 10-2014-0027265 A | 3/2014 |
| KR | 10-2014-0114022 A | 9/2014 |
| KR | 10-2015-0038177 A | 4/2015 |
| KR | 10-1522941 B1 | 6/2015 |
| KR | 10-2016-0066039 A | 6/2016 |
| KR | 10-2016-0114106 A | 10/2016 |
| NL | 8003956 A | 1/1981 |
| TW | 200801231 A | 1/2008 |
| TW | 201315593 A | 4/2013 |
| TW | 201332768 A | 8/2013 |
| TW | 201442968 A | 11/2014 |
| TW | 201447029 A | 12/2014 |
| TW | 201529511 A | 8/2015 |
| TW | 201540498 A | 11/2015 |
| TW | 201545886 A | 12/2015 |
| TW | 201545887 A | 12/2015 |
| TW | 201612340 A | 4/2016 |
| TW | 201704184 A | 2/2017 |
| TW | 201716245 A | 5/2017 |
| WO | 92/22604 A1 | 12/1992 |
| WO | 95/17537 A1 | 6/1995 |
| WO | 99/19533 A1 | 4/1999 |
| WO | 2002/075796 A1 | 9/2002 |
| WO | 02/84722 A2 | 10/2002 |
| WO | 03/44079 A1 | 5/2003 |
| WO | 2005/048669 A1 | 5/2005 |
| WO | 2006/093639 A1 | 9/2006 |
| WO | 2007/018028 A1 | 2/2007 |
| WO | 2007/121524 A1 | 11/2007 |
| WO | 2008/007622 A1 | 1/2008 |
| WO | 2008/044884 A1 | 4/2008 |
| WO | 2010/051106 A2 | 5/2010 |
| WO | 2010/059710 A1 | 5/2010 |
| WO | 2010/079688 A1 | 7/2010 |
| WO | 2010/098762 A1 | 9/2010 |
| WO | 2010/121524 A1 | 10/2010 |
| WO | 2010/128611 A1 | 11/2010 |
| WO | 2010/129459 A2 | 11/2010 |
| WO | 2011/031507 A1 | 3/2011 |
| WO | 2011/048979 A1 | 4/2011 |
| WO | 2011/104500 A1 | 9/2011 |
| WO | 2011/142280 A1 | 11/2011 |
| WO | 2012/000686 A1 | 1/2012 |
| WO | 2012/014499 A1 | 2/2012 |
| WO | 2012/057893 A2 | 5/2012 |
| WO | 2012/074952 A1 | 6/2012 |
| WO | 2012/144499 A1 | 10/2012 |
| WO | 2013/006865 A2 | 1/2013 |
| WO | 2013/032191 A2 | 3/2013 |
| WO | 2013/044941 A1 | 4/2013 |
| WO | 2013/058217 A1 | 4/2013 |
| WO | 2013/101975 A1 | 7/2013 |
| WO | 2013/119737 A2 | 8/2013 |
| WO | 2013/179881 A1 | 12/2013 |
| WO | 2014/050798 A1 | 4/2014 |
| WO | 2014/093193 A1 | 6/2014 |
| WO | 2014/093740 A1 | 6/2014 |
| WO | 2014/093775 A1 | 6/2014 |
| WO | 2014/093776 A1 | 6/2014 |
| WO | 2014/142280 A1 | 9/2014 |
| WO | 2014/151353 A1 | 9/2014 |
| WO | 2014/163035 A1 | 10/2014 |
| WO | 2015/054098 A1 | 4/2015 |
| WO | 2015/057605 A1 | 4/2015 |
| WO | 2015/112958 A1 | 7/2015 |
| WO | 2015/113020 A1 | 7/2015 |
| WO | 2015/113023 A1 | 7/2015 |
| WO | 2015/113030 A1 | 7/2015 |
| WO | 2015/119210 A1 | 8/2015 |
| WO | 2015/156395 A1 | 10/2015 |
| WO | 2015/157202 A1 | 10/2015 |
| WO | 2015/163134 A1 | 10/2015 |
| WO | 2016/017645 A1 | 2/2016 |
| WO | 2016/187186 A1 | 11/2016 |
| WO | 2016/209897 A1 | 12/2016 |
| WO | 2017/087745 A1 | 5/2017 |
| WO | 2018/038961 A1 | 3/2018 |
| WO | 2019/036710 A1 | 2/2019 |
| WO | 2019/100050 A1 | 5/2019 |

OTHER PUBLICATIONS

3M Dyneon High Temperature Perfluoroelastomer PFE 4131TZ—Technical Data, 2013.

ASTM International E595-07, Standard Test Method for Total Mass Loss and Collected Volatile Condensable Materials from Outgassing in a Vacuum Environment (2013).

Biederman; "The Properties of Films Prepared By the RF Sputtering of PTFE and Plasma Polymerization of Some Freons"; Vacuum, vol. 31, No. 7, Jan. 1, 1981, pp. 285-289.

Bosher et al; "Influence of Cyclic Organosilicon Precursors On the Corrosion of Aluminium Coated Sheet By Atmospheric Pressure Dielectric Barrier Discharge"; Surface & Coatings Technology, 205 (2011) pp. 5350-5357.

Cech et al; "Surface-Free Energy of Silicon-Based Plasma Polymer Films"; Silanes and Other Coupling Agents, vol. 5, 2009; pp. 333-348.

Chemraz "Perfluoroelastomers—Seals That Withstand the Test of Time", Greene Tweed Medical & Biotechnology, 2000, 4 Pages.

Chiao et al; "Worldwide First Ultra-Thin LTPS-TFT LCD By a Glass on Carrier Technology"; V3, Submitted to SID 2015; 5 Pages.

Dupont Kalrez Perfluoroelastomer Parts—Physical Properties and Product Comparisons, Technical Information—Rev. 11, Sep. 2012; 4 Pages.

Girifalco et al; "A Theory for the Estimation of Surface and Interfacial Energies. I. Derivation and Application to Interfacial Tension"; Applied Science Research Lab, Cincinnati Ohio; vol. 61 (1956); pp. 904-909.

Groenewoud et al; "Plasma Polymerization of Thiophene Derivatives"; Langmuir, 2003, vol. 19, No. 4; pp. 1368-1374.

Hair; "Hydroxyl Groups on Silica Surface", Journal of Non-Crystalline Solids; 19 (1975) 299-309, .COPYRGT. North-Holland Publishing.

Haller; "Polymerization of Aromatic Silanes in RF Plasmas"; J. Electrochem Soc.: Solid-State Science and Technology; vol. 129, No. 1; Jan. 1982; pp. 180-183.

Haque et al; "Preparation and Properties of Plasma-Deposited Films With Surface Energies Varying Over a Wide Range"; Journal of Applied Polymer Science, vol. 32, 4369-4381 (1986).

Hiltz; Techniques for the Characterization of Fluoroelastomers, Defence R&D Canada-Atlantic Technical Memorandum Dec. 2009; 52 Pages.

Iller, John Wiley and Sons; "The Surface Chemistry of Silica"; Chapter 6, 1979, pp. 622-656.

Jaszewski et al; "The Deposition of Anti-Adhesive Ultra-Thin Teflon-Like Films and Their Interaction With Polymers During Hot Embossing"; Applied Surface Science, 143 (1999) 301-308.

Kuritka et al; "Mass Spectrometry Characterization of Methylphenylsilane-Hydrogen RF Plasmas"; Plasma Process. Polym. 2007, 4, 53-61.

Kuschnereit et al; "Mechanical and Elastic Properties of Amorphous Hydrogenated Silicon Films Studied By Broadband Surface Acoustic Wave Spectroscopy"; Appl. Phys. A 61, 269-276 (1995).

Lowe et al; "Plasma Polymerized P-Xylene as a Laser Fusion Target"; Surface Science, 1978, vol. 76, No. 1; pp. 242-256.

Lubguban, Jr. et al; "Low-K Organosilicate Films Prepared By Tetravinyltetramethylcyclotetrasiloxane", J. of Applied Physics, V92, N2, P1033-1038, 2002.

Maszara et al; "Bonding of Silicon Wafers for Silicon-on-Insulators"; J. Appl. Phys. 64 (10), Nov. 15, 1988; pp. 4943-4950.

(56) References Cited

OTHER PUBLICATIONS

Mazumder et al (WO 2015-112958), Jul. 30, 2015.

McMillian et al; "Hydroxyl Sites in SiO2 Glass: A Note on Irfrared and Raman Spectra", American Mineralogist, vol. 71 pp. 772-778, 1986.

Merche et al; "Atmospheric Plasmas for Thin Film Deposition: A Critical Review"; Thin Solid Films 520, (2012) 4219-4236.

Morita et al; "Applications of Plasma Polymerization"; Pure & Appl. Chem., vol. 57, No. 9 pp. 1277-1286 (1985).

Nagai et al; "Structure and Morphology of Phenylsilanes Polymer Films Synthesized By the Plasma Polymerization Method"; Journal of Material Science 33, (1998); 1897-1905.

Nehlsen et al; "Gas Permeation Properties of Plasma Polymerized Thin Film Siloxane-Type Membranes for Temperatures up to 350C"; Journal of Membrane Science; 106 (1995) pp. 1-7.

Nouicer et al; "Superhydrophobic Surface Produced on Polyimide and Silicon By Plasma Enhanced Chemical Vapour Deposition From Hexamethyldisiloxane Precursor"; International Journal of Nanotechnology, vol. 12, Nos. 8/9, 2015; pp. 597-607.

Oujja et al; "Multiphoton Dissociation of Phenylsilane Upon Excitation At 212.5NM"; Laser Chem., vol. 16, pp. 157-166.

Parker et al; "Surface Forces Between Plasma Polymer Films"; Langmuir 1994, 10, 276-2773.

Perlast G67P—Technical Data Sheet, Issue 4, Revision 1, Jan. 2006; 1 Page.

Polydiallyldimethylammonium chloride, Sigma Aldrich, retrieved Apr. 23, 2022. (Year: 2022).

Rouessac et al; "Precursor Chemistry for ULK CVD", Microelectronic Engineering, V82, p. 333-340, 2005.

Salyk et al; "Plasma Polymerisation of Methylphenylsilane"; Surface & Coatings Technology, 20, (2005) pp. 486-489.

Shieh et al; "Modifications of Low Dielectric Constant Fluorinated Amorphous Carbon Films By Multiple Plasma Treatments"; J. Electro. Soc.; 149 (7) G384-G390 (2002.

Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity"; J. Phys. Chem. 1982, 86, 5208-5219.

Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).

Stoffels et al; "Polymerization of Fluorocarbons in Reactive Ion Etching Plasma"; Journal of Vacuum Science and Technology; Part A, AVS / AIP, Melville, NY, vol. 16, No., 1, Jan. 1, 1998, pp. 87-95.

Suratawal et al; "Surface Chemistry and Trimethylsilyl Functionalization of Stober Silica Sols"; Journal of Non-Crystalline Solids 316 (2003), pp. 349-363.

Tauc et al.; "Optical Properties and Electronic Structure of Amorphous Germanium"; Phys. Stat. Sol. 15, (1966) pp. 627-637.

Terlingen et al; "Plasma Modification of Polymeric Surfaces for Biomedical Applications"; Advanced Biomaterials in Biomedical Engineering and Drug Delivery Systems, 1996; pp. 38-42.

Tillet et al; "Crosslinking of Fluoroelastomers By "Click" Azide-Nitride Cyloaddtion"; Journal of Polymer Science, Part A: Polymer Chemistry; 2015, 53, pp. 1171-1173.

Tong et al; "Reversible Silicon Wafer Bonding for Surface Protection: Water-Enhanced Debonding"; J. Electrochem. Soc., vol. 139, No. 11, Nov. 1992, pp. L101-L102.

Trelleborg Sealing Solutions, Isolast(Registered) Perfluororelastomer Seals, Edition Nov. 2008; pp. 1-16; www.tss.trelleborg.com.

Van De Ven et al; "Deactivation With Silazanes in Chromatography, Mechanism of the Reaction and Practical Consequences in Capillary GC and RP-HPLC: A29SI GP-MAS NMR Study"; Journal of High Resolution Chromatography & Chromatography Communications; vol. 9, 1986; pp. 741-746.

Wang et al; "Dynamic Contact Angles and Contact Angle Hysteresis of Plasma Polymers"; Langmuir 1994, 10, pp. 3887-3897.

Weidman et al; "New Photodefinable Glass Etch Masks for Entirely Dry Photolithography Plasma Deposited Organosilicon Hydride Polymers"; Appl. Phys. Leti. 62 (4), Jan. 25, 1993 pp. 372-374.

Li Qingnian , "Film products design, production and processing of new technology and application of new technology practice book", Yinsheng Audiovisual publishing house, vol. 1, 2004—Machine Translation.

Tanizaki Yoshiharu, et al., "Macromolecular surfactant", Oil Chemistry, vol. 34, No. 11, Nov. 1985, 6 pages.

Worldwide First Ultra-thin LTPS-TFT LCD by a Glass on Carrier Technology, Chiao, et al., v3, submitted to SID 2015.

Wu; "Calculation of Interfacial Tension in Polymer Systems"; J. Polymer. Sci.: Part C; No. 34, pp. 19-30 (1971).

Wu; "Polymer Interface and Adhesion"; Modifications of Polymer Surfaces, Chapter 9—Marcel Dekker; pp. 298-321.

Zhuravlev; "The Surface Chemistry of Amorphous Silica. Zhuravlev Model"; Colloids and Surfaces A: Physicochemical and Engineering Aspects; 173 (2000) 1-38.

METHODS FOR MAKING CONTROLLABLY BONDED SHEETS

CROSS-REFERENCE TO RELATED APPLICATIONS

This application is a divisional of U.S. patent application Ser. No. 16/327,145 filed on Feb. 21, 2019, now U.S. Pat. No. 11,535,553, which claims the benefit of priority under 35 U.S.C. § 371 of International Application No. PCT/US2017/049025, filed on Aug. 29, 2017, which claims the benefit of priority under 35 U.S.C. § 119 of U.S. Provisional Application No. 62/381,731 filed on Aug. 31, 2016, the content of which is relied upon and incorporated herein by reference in its entireties.

FIELD

The present disclosure relates generally to articles including and methods for making sheets on carriers and, more particularly, to articles including and methods for making flexible glass sheets controllably bonded on glass carriers.

BACKGROUND

Flexible substrate materials offer the ability to manufacture cheaper devices using roll-to-roll processing, and the potential to make thinner, lighter, more flexible and durable displays. However, the technology, equipment, and processes required for roll-to-roll processing of high quality displays are not yet fully developed. Because panel makers have already heavily invested in toolsets to process large sheets of glass, laminating a flexible substrate to a carrier and making display devices on the flexible substrate by sheet-to-sheet processing offers a shorter term solution to develop the value proposition of thinner, lighter, and more flexible displays. Displays have been demonstrated on polymer sheets, for example polyethylene naphthalate (PEN), where the device fabrication was sheet-to-sheet with the PEN laminated to a glass carrier. However, the upper temperature limit of the PEN limits the device quality and process that can be used. In addition, the high permeability of the polymer substrate leads to environmental degradation of organic light emitting diode (OLED) devices where a near hermetic package is required. Thin film encapsulation offers the promise to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

In low temperature polysilicon (LTPS) device fabrication processes, for example with temperatures typically approaching 600° C. or greater, vacuum, and wet etch environments may also be used. These conditions limit the materials that may be used, and place high demands on the carrier/thin sheet. Accordingly, what is desired is a carrier approach that utilizes the existing capital infrastructure of the manufacturers, enables processing of thin glass, i.e., glass having a thickness≤0.3 millimeters (mm) thick, without contamination or loss of bond strength between the thin glass and carrier at higher processing temperatures, and wherein the thin glass debonds easily from the carrier at the end of the process.

One commercial advantage is that manufacturers will be able to utilize their existing capital investment in processing equipment while gaining the advantages of the thin glass sheets for photo-voltaic (PV) structures, OLED, liquid crystal displays (LCDs) and patterned thin film transistor (TFT) electronics, for example. Additionally, such an approach enables process flexibility, including: processes for cleaning and surface preparation of the thin glass sheet and carrier to facilitate bonding.

A challenge of known bonding methods is the high temperature used to process polysilicon TFTs. The demand for higher pixel density, high resolution, and fast refresh rates on hand held displays, notebook and desktop displays, as well as the wider use of OLED displays, is pushing panel makers from amorphous silicon TFT backplanes to oxide TFT or polysilicon TFT backplanes. Because OLEDs are a current driven device, high mobility is desired. Polysilicon TFTs also offer the advantage of integration of drivers and other components activation. In polysilicon TFT processes, higher temperature is preferred for dopant activation, ideally at temperature over 600° C.

SUMMARY

In light of the above, there is a need for a thin sheet-carrier article that can withstand the rigors of TFT and flat panel display (FPD) processing, including high temperature processing (without outgassing that would be incompatible with the semiconductor or display making processes in which it will be used), yet allow the entire area of the thin sheet to be removed (either all at once, or in sections) from the carrier so as to allow reuse of the carrier for processing another thin sheet. The present specification describes methods to control adhesion between the multi-sheet articles (e.g., carrier and thin sheet) and create a temporary bond sufficiently strong to survive TFT and FPD processing (including processing at temperatures of about 300° C., about 400° C., about 500° C., and up to at least 600° C., including any ranges and subranges therebetween) but weak enough to permit debonding of the sheet from the carrier, even after high-temperature processing. Such controlled bonding can be utilized to create an article having a re-usable carrier, or alternately an article having patterned areas of controlled bonding between a carrier and a sheet. More specifically, the present disclosure provides coating layers (including various materials and associated surface treatments), that may be provided on the thin sheet, the carrier, or both, to control both room-temperature van der Waals, and/or hydrogen, bonding and high temperature covalent bonding between the thin sheet and carrier. Even more specifically, the present disclosure describes methods of depositing a coating layer that can bond a thin sheet to a carrier, methods for preparing the coating layer for bonding, and bonding the coating layer to both the thin sheet and the carrier. These methods produce bonding between the components such that the bonding energy is not too high, which might render the components inseparable after electronic device processing, and such that the bonding energy is not too low, which might lead to compromised bonding quality thus leading to possible debonding or fluid ingress between the thin sheet and carrier during electronic device processing. These methods also produce a glass article that exhibits low outgassing and survives high temperature processing for example, LTPS TFT processing as well as additional processing steps, for example wet cleaning and dry etching. In alternative examples, the coating layers may be used to create various controlled bonding areas (wherein the carrier and thin sheet remain sufficiently bonded through various processes, including vacuum processing, wet processing, and/or ultrasonic cleaning processing), together with covalent bonding regions to provide for further processing options, for example, maintaining hermeticity between the carrier and sheet even after dicing the article into smaller pieces for additional device processing.

In a first aspect, there is an article comprising:
a first sheet comprising a first sheet bonding surface, and
a coating layer comprising a first coating layer bonding surface and a second coating layer bonding surface, the coating layer comprising a polymerized hydrogenated amorphous hydrocarbon compound, the coating layer has a refractive index above about 1.8.

In some examples of aspect 1, the coating layer has a refractive index less than about 2.5.

In another example of aspect 1, the coating layer has a refractive index between about 1.9 and about 2.4.

In a second aspect, there is an article comprising:
a first sheet comprising a first sheet bonding surface, and
a coating layer comprising a first coating layer bonding surface and a second coating layer bonding surface, the coating layer comprising a polymerized hydrogenated amorphous hydrocarbon compound, the coating layer has an optical band gap of less than 2 eV.

In some examples of aspect 2, the coating layer has an optical band gap ranging from about 0.8 to about 2 eV.

In another example of aspect 2, the coating layer has an optical band gap ranging from about 1.2 to about 1.8 eV.

In a third aspect, there is an article comprising:
a first sheet comprising a first sheet bonding surface, and
a coating layer comprising a first coating layer bonding surface and a second coating layer bonding surface, the coating layer comprising a polymerized hydrogenated amorphous hydrocarbon compound, the coating layer has a Raman spectrum with an intensity ratio (D/G ratio) of a peak (D band) appearing in the range of 1350 to 1400 cm$^{-1}$ to a peak (G band) appearing in the range of 1530 to 1600 cm$^{-1}$ of about 0.5 to about 0.6.

In some examples of aspect 3, the intensity ratio (D/G ratio) may be in the range of about 0.52 to about 0.58.

In another example of aspect 3, the peak (D band) may be at about 1380 cm$^{-1}$ and the peak (G band) may be at about 1530 cm$^{-1}$ of Raman spectrum.

In a fourth aspect, there is an article comprising:
a first sheet comprising a first sheet bonding surface;
a coating layer comprising a first coating layer bonding surface and a second coating layer bonding surface, the coating layer comprising a polymerized hydrogenated amorphous hydrocarbon compound, the coating layer being formed by depositing a precursor compound having a hydrogen and carbon content of greater than 90 weight percent; and
the first coating layer bonding surface being bonded with the first sheet bonding surface with a bond energy of less than 700 mJ/m$^2$ after holding the article in a furnace at a temperature of 600° C. for 10 minutes in a nitrogen atmosphere.

In a fifth aspect, there is provided an article of any of aspects 1-4, the coating layer is formed by depositing a hydrocarbon compound, the hydrocarbon compound having a formula of $C_nH_y$, wherein n is 1 to 6 and y is 2 to 14.

In some examples of aspect 5, the first coating layer bonding surface having an as-deposited surface energy greater than about 50 mJ/m$^2$.

In another example of aspect 5, the as-deposited surface energy of the first coating layer bonding surface being less than about 60 mJ/m$^2$.

In another example of aspect 5, the as-deposited surface energy of the first coating layer bonding surface being between about 50 mJ/m$^2$ and about 58 mJ/m$^2$.

In another example of aspect 5, the hydrocarbon compound is an alkane, the alkane being selected from the group consisting of methane, ethane, propane, butane, pentane and hexane.

In another example of aspect 5, the hydrocarbon compound is an alkene, the alkene being selected from the group consisting of ethylene, propylene, butylene, pentene and hexene.

In another example of aspect 5, the hydrocarbon compound is an alkyne, the alkyne being selected from the group consisting of ethyne, propyne, butyne, pentyne and hexyne.

In a sixth aspect, there is provided an article of any of aspects 1-5, further comprising a second sheet comprising a second sheet bonding surface.

In some examples of aspect 6, the second coating layer bonding surface being bonded with the second sheet bonding surface.

In another example of aspect 6, the first sheet being a glass sheet.

In another example of aspect 6, the second sheet being a glass sheet.

In another example of aspect 6, the first sheet being a glass sheet and the second sheet being a glass sheet.

In a seventh aspect, there is provided an article of any of the examples of aspect 6, the polymerized hydrocarbon compound being formed by depositing the hydrocarbon compound on either the first sheet bonding surface or the second sheet bonding surface using low-pressure plasma chemical vapor deposition or atmospheric pressure plasma chemical vapor deposition.

In an eighth aspect, there is provided an article of any of aspects 1-6, the coating layer having an average thickness of less than 10 nm.

In a ninth aspect, there is provided an article of any of aspects 1-6, the coating layer having an average thickness of less than 5 nm.

In a tenth aspect, there is provided an article of any of aspects 1-6, the coating layer being a single layer.

In an eleventh aspect, there is provided an article of any of aspects 1-6, the first sheet having an average thickness greater than or equal to 200 μm.

In a twelfth aspect, there is provided an article of any of aspects 1-6, the first coating layer bonding surface being bonded with the first sheet bonding surface with a bond energy of less than 600 mJ/m$^2$ after holding the article in a furnace at a temperature of 600° C. for 10 minutes in a nitrogen atmosphere.

In a thirteenth aspect, there is provided an article of any of aspects 1-6, the first coating layer bonding surface being bonded with the first sheet bonding surface with a bond energy of less than 500 mJ/m$^2$ after holding the article in a furnace at a temperature of 500° C. for 10 minutes in a nitrogen atmosphere.

In a fourteenth aspect, there is provided an article of any of the Examples of aspect 6, the change in percent bubble area of the coating layer being less than 10 percent according to Outgassing Test #1 after holding the article in a furnace at a temperature of 600° C. for 10 minutes in a nitrogen atmosphere.

In a fifteenth aspect, there is provided an article of any of aspects 1-6, the change in percent bubble area of the coating layer being less than 10 percent according to Outgassing Test #1 after holding the article in a furnace at a temperature of 500° C. for 10 minutes in a nitrogen atmosphere.

In a sixteenth aspect, there is provided an article of any of aspects 1-6, the change in percent bubble area of the coating layer being less than 5 percent according to Outgassing Test #1 after holding the article in a furnace at a temperature of 500° C. for 10 minutes in a nitrogen atmosphere.

In a seventeenth aspect, there is provided an article of any of aspects 12-16, the first coating layer bonding surface being exposed to a nitrogen and oxygen atmosphere to increase the surface energy of the first coating layer bonding surface prior to holding the article in a furnace at a temperature of 500° C. or greater for 10 minutes in a nitrogen atmosphere.

In an eighteenth aspect, there is a method of making an article comprising:
  forming a coating layer comprising a polymerized hydrocarbon compound on a bonding surface of a first sheet by depositing a hydrocarbon compound on the bonding surface of the first sheet using plasma chemical vapor deposition, the coating layer comprising a first coating layer bonding surface bonded to the bonding surface of the first sheet and a second coating layer bonding surface, and the hydrocarbon compound having a formula of $C_nH_y$, wherein n is 1 to 6 and y is 2 to 14; and
  bonding the second coating layer bonding surface with a second sheet bonding surface of a second sheet, the second coating layer bonding surface being bonded with the second sheet bonding surface with a bond energy of less than 700 mJ/m² after holding the article in a furnace at a temperature of 600° C. for 10 minutes in a nitrogen atmosphere.

In some examples of aspect 18, the hydrocarbon compound is an alkane, the alkane being selected from the group consisting of methane, ethane, propane, butane, pentane and hexane.

In another example of aspect 18, the hydrocarbon compound is an alkene, the alkene being selected from the group consisting of ethylene, propylene, butylene, pentene and hexene.

In another example of aspect 18, the hydrocarbon compound is an alkyne, the alkyne being selected from the group consisting of ethyne, propyne, butyne, pentyne and hexyne.

In another example of aspect 18, the polymerized hydrocarbon compound being a hydrogenated amorphous compound.

In another example of aspect 18, the first sheet being a glass sheet.

In another example of aspect 18, the second sheet being a glass sheet.

In another example of aspect 18, the first sheet being a glass sheet and the second sheet being a glass sheet.

In nineteenth aspect, there is provided an article of aspect 18, further comprising increasing the surface energy of the second coating layer bonding surface before the second sheet bonding surface is bonded to the second coating layer bonding surface, wherein the surface energy is increased by exposing the second coating layer bonding surface to oxygen, nitrogen, or a combination thereof.

In another example of aspect 19, the coating layer having an average thickness of less than 10 nm.

In another example of aspect 19, the coating layer having an average thickness of less than 5 nm.

In another example of aspect 19, the second sheet having an average thickness less than or equal to 300 μm.

In another example of aspect 19, the plasma chemical vapor deposition being low-pressure plasma chemical vapor deposition or atmospheric pressure plasma chemical vapor deposition.

In a twentieth aspect, there is provided an article of aspect 19, the second coating layer bonding surface being bonded with the second sheet bonding surface with a bond energy of less than 600 mJ/m² after holding the article in a furnace at a temperature of 500° C. for 10 minutes in a nitrogen atmosphere.

In a twenty-first aspect, there is provided an article of aspect 19, the change in percent bubble area of the second coating layer being less than 10 percent according to Outgassing Test #1 after holding the article in a furnace at a temperature of 600° C. for 10 minutes in a nitrogen atmosphere.

In a twenty-second aspect, there is provided an article of aspect 19, the change in percent bubble area of the second coating layer being less than 10 percent according to Outgassing Test #1 after holding the article in a furnace at a temperature of 500° C. for 10 minutes in a nitrogen atmosphere.

In a twenty-third aspect, there is provided an article of aspect 19, the change in percent bubble area of the second coating layer being less than 5 percent according to Outgassing Test #1 after holding the article in a furnace at a temperature of 500° C. for 10 minutes in a nitrogen atmosphere.

In a twenty-fourth aspect, there is provided an article of aspect 18, the second coating layer bonding surface having an as-deposited surface energy greater than about 50 mJ/m².

In a twenty-fifth aspect, there is provided an article of any of aspects 18-23, the coating layer having a refractive index above about 1.8 or 2.

In a twenty-sixth aspect, there is provided an article of any of aspects 18-23, the coating layer having an optical band gap less than about 2 eV.

In a twenty-seventh aspect, there is provided an article of any of aspects 18-23, the coating layer having an intensity ratio (D/G ratio) of a peak (D band) appearing in the range of 1350 to 1400 cm$^{-1}$ to a peak (G band) appearing in the range of 1530 to 1600 cm$^{-1}$ of Raman spectrum in the range of about 0.5 to about 0.6.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawings are included to provide a further understanding of principles of the disclosure, and are incorporated in and constitute a part of this specification. The drawings illustrate some examples(s), and together with the description serve to explain, by way of example, principles and operation thereof. It is to be understood that various features disclosed in this specification and in the drawings can be used in any and all combinations. By way of non-limiting example the various features may be combined with one another as set forth in the specification, above, as aspects.

BRIEF DESCRIPTION OF THE DRAWINGS

The above and other features, examples and advantages of aspects of the examples disclosed in the present specification are better understood when the following detailed description thereof is read with reference to the accompanying drawings, in which.

DETAILED DESCRIPTION

Figure 1:
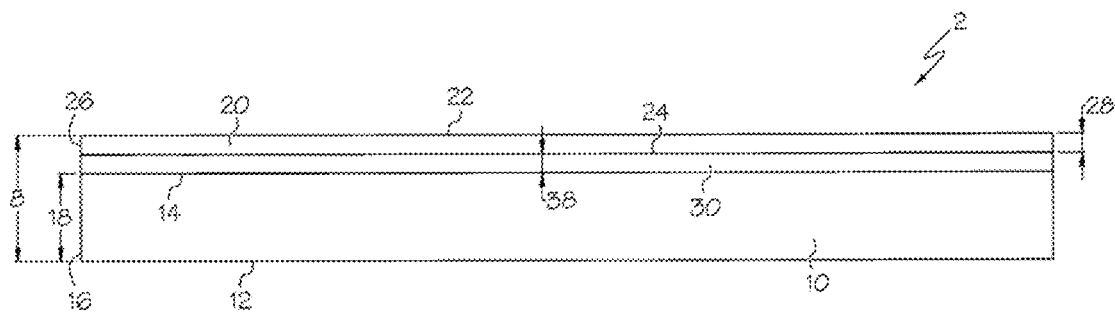
FIG. 1 is a schematic side view of an article having a carrier bonded to a thin sheet with a coating layer therebetween.

Examples will now be described more fully hereinafter with reference to the accompanying drawings. Whenever possible, the same reference numerals are used throughout the drawings to refer to the same or like parts. However, the claimed subject matter may be embodied in many different forms and should not be construed as limited to the examples set forth herein.

Directional terms as used herein (e.g., up, down, right left, front, back, top, bottom) are made only with reference to the figures as drawn and are not intended to imply absolute orientation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Provided are solutions for the processing of a second sheet on a first sheet, whereby at least portions (including up to all) of a second sheet, for example, a thin sheet (for example a thin glass sheet), remain "non-bonded" so that devices processed on the thin sheet may be removed from the first sheet, for example, a carrier, for example a glass carrier. In order to maintain advantageous surface shape characteristics, the carrier is typically a display grade glass substrate. Accordingly, in some situations, it is wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of the processing lines, for example TFT, including high temperature processing, wherein high temperature processing is processing at a temperature ≥400° C., and may vary depending upon the type of device being made, for example, temperatures up to about 450° C. as in amorphous silicon or amorphous indium gallium zinc oxide (IGZO) backplane processing, up to about 500-550° C. as in crystalline IGZO processing, or up to about 600-650° C. as is typical in LTPS and TFT processes—and yet still allows the thin sheet to be easily removed from the carrier without damage (for example, wherein one of the carrier and the thin sheet breaks or cracks into two or more pieces) to the thin sheet or carrier, whereby the carrier may be reused.

Glass Article

Figure 2:
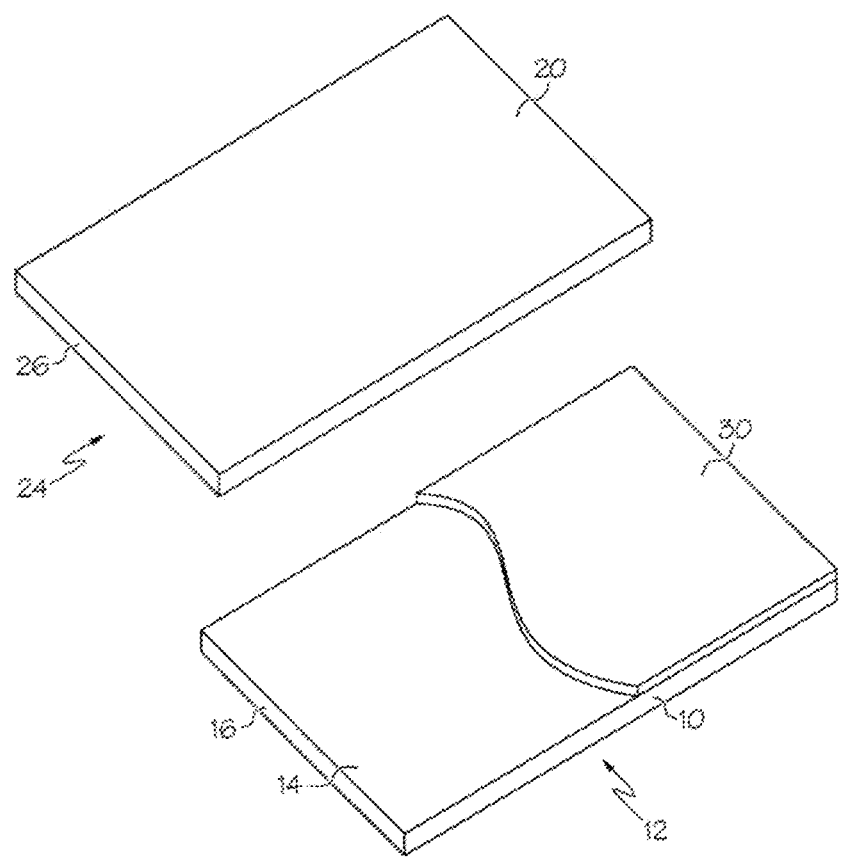
FIG. 2 is an exploded and partially cut-away view of the article in FIG. 1.

As shown in FIGS. 1 and 2, an article 2, for example a glass article, has a thickness 8, and includes a first sheet 10 (for example a carrier) having a thickness 18, a second sheet 20 (e.g., a thin glass sheet) having a thickness 28, and a coating layer 30 having a thickness 38. Thickness 28 of the second sheet 20 may be, for example, equal to or less than about 300 micrometers (μm, or microns), including but not limited to thicknesses of, for example, about 10 to about 50 micrometers, about 50 to about 100 micrometers, about 100 to about 150 μm, about 150 to about 300 μm, about 300 μm, about 250 μm, about 200 μm, about 190 μm, about 180 μm, about 170 μm, about 160 μm, about 150 μm, about 140 μm, about 130 μm, about 120 μm, about 110 μm, about 100 μm, about 90 μm, about 80 μm, about 70 μm, about 60 μm, about 50 μm, about 40 μm, about 30 μm, about 20 μm, or about 10 μm, including any ranges and subranges therebetween.

The glass article 2 is arranged to allow the processing of second sheet 20 in equipment designed for thicker sheets, for example, those on the order of greater than or equal to about 0.4 mm, for example 0.4 mm, 0.5 mm, 0.6 mm, 0.7 mm, 0.8 mm, 0.9 mm, or 1.0 mm, although the second sheet 20 itself is equal to or less than about 300 μm. The thickness 8, which is the sum of thicknesses 18, 28, and 38, can be equivalent to that of the thicker sheet for which a piece of equipment, for example, equipment designed to dispose electronic device components onto substrate sheets, was designed to process. In some examples, if the processing equipment was designed for a 700 μm sheet, and the second sheet had a thickness 28 of 300 μm, then thickness 18 would be selected as 400 μm, assuming that thickness 38 is negligible. That is, the coating layer 30 is not shown to scale, but rather it is greatly exaggerated for sake of illustration only. Additionally, in FIG. 2, the coating layer is shown in cut-away. The coating layer can be disposed uniformly over the bonding surface 14 when providing a reusable carrier. Typically, thickness 38 will be on the order of nanometers, for example 2 nm to 250 nm, 5 nm to 100 nm, 8 nm to 80 nm, or 10 to 50 nm, or about 20, 30, or 40 nm. The presence of a coating layer may be detected by surface chemistry analysis, for example by time-of-flight secondary ion mass spectrometry (ToF SIMS).

First sheet 10, which may be used as a carrier for example, has a first surface 12, a bonding surface 14, and a perimeter 16. The first sheet 10 may be of any suitable material including glass. The first sheet can be a non-glass material, for example, ceramic, glass-ceramic, silicon, or metal (as the surface energy and/or bonding may be controlled in a manner similar to that described below in connection with a glass carrier). If made of glass, first sheet 10 may be of any suitable composition including alumino-silicate, boro-silicate, alumino-boro-silicate, soda-lime-silicate, and may be either alkali containing or alkali-free depending upon its ultimate application. Further, in some examples, when made of glass, glass-ceramic, or other material, the first sheet bonding surface can be made of a coating or layer of metal material disposed on the underlying bulk material of the first sheet. Thickness 18 may be from about 0.2 to about 3 mm, or greater, for example, about 0.2 mm, about 0.3 mm, about 0.4 mm, about 0.5 mm, about 0.6 mm, about 0.65 mm, about 0.7 mm, about 1.0 mm, about 2.0 mm, or about 3.0 mm, or greater, including any ranges and subranges therebetween, and will depend upon the thickness 28, and thickness 38 when thickness 38 is non-negligible, as noted above. The thickness 18 of the first sheet 10 in some examples may be greater than the thickness 28 of the second sheet 20. In some examples, thickness 18 may be less than thickness 28. In one embodiment, the first sheet 10 may be made of one layer, as shown, or multiple layers (including multiple thin sheets) that are bonded together. Further, the first sheet may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The second sheet 20 has a first surface 22, a bonding surface 24, and a perimeter 26. Perimeters 16 (first sheet 10) and 26 (second sheet 20) may be of any suitable shape, may be the same as one another, or may be different from one another. Further, the second sheet 20 may be of any suitable material including glass, ceramic, glass-ceramic, silicon, or metal. As described above for the first sheet 10, when made of glass, second sheet 20 may be of any suitable composition, including alumino-silicate, boro-silicate, alumino-boro-silicate, soda-lime-silicate, and may be either alkali containing or alkali-free depending upon its ultimate application. The coefficient of thermal expansion of the thin sheet can be matched substantially the same with that of the first sheet to reduce any warping of the article during processing at elevated temperatures. The thickness 28 of the second sheet 20 is about 300 µm or less, such as about 200 µm or about 100 µm, or thicknesses as noted above. Further, the second sheet 20 may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The glass article 2 can have a thickness that accommodates processing with existing equipment, and likewise it can survive the harsh environment in which the processing takes place. For example, flat panel display (FPD) processing may include wet ultrasonic, vacuum, and high temperature (e.g., ≥400° C., ≥450° C., ≥500° C., ≥550° C., and up to at least 600° C.), processing, including any ranges and subranges therebetween.

To survive the harsh environment in which article 2 will be processed, the bonding surface 14 should be bonded to bonding surface 24 with sufficient strength so that the second sheet 20 does not separate from first sheet 10. This strength should be maintained throughout the processing so that second sheet 20 does not separate from first sheet 10 during processing. Further, to allow second sheet 20 to be removed from first sheet 10 (so that a first sheet 10, for example a carrier, may be reused, for example), the bonding surface 14 should not be bonded to bonding surface 24 too strongly either by the initially designed bonding force, and/or by a bonding force that results from a modification of the initially designed bonding force as may occur, for example, when the article undergoes processing at high temperatures, e.g., temperatures of ≥about 400° C. to about 500° C.≥about 500° C., to about 600° C., and at least 600° C., including any ranges and subranges therebetween. The coating layer 30 may be used to control the strength of bonding between bonding surface 14 and bonding surface 24 so as to achieve both of these objectives. The controlled bonding force is achieved by controlling the contributions of van der Waals (and/or hydrogen bonding) and covalent attractive energies to the total adhesion energy which is controlled by modulating the polar and non-polar surface energy components of first sheet 10 and second sheet 20. Alternatively, the coating layer 30 may completely cover one bonding surface (for example bonding surface 14) of one sheet and present a coating layer bonding surface (having characteristics independent of those on the one bonding surface) for coupling to another bonding surface (for example bonding surface 24) of another sheet. This controlled bonding is strong enough to survive FPD processing, for instance, including temperatures ≥400° C., and in some instances, processing temperatures of ≥500° C., ≥550° C., and up to at least 600° C., including any ranges and subranges therebetween, and remain debondable by application of a force sufficient to separate the sheets but not cause significant damage to first sheet 10 and/or second sheet 20. For example, the applied force should not break either the first sheet 10 or second sheet 20. Such debonding permits removal of second sheet 20 and the devices fabricated thereon, and also allows for re-use of first sheet 10 as a carrier.

Although the coating layer 30 is shown as a solid layer between sheet 20 and sheet 10, such need not be the case. For example, the layer 30 may be on the order of about 0.1 nm to about 1 µm thick (e.g., about 1 nm to about 10 nm, about 10 nm to about 50 nm, about 50 nm to about 100 nm, about 250 nm, about 500 nm to about 1 µm), and may not completely cover the entire portion of the bonding surface 14. For example, the coverage on bonding surface 14 may be ≤ about 100%, from about 1% to about 100%, from about 10% to about 100%, from about 20% to about 90%, or from about 50% to about 90% of the bonding surface 14, including any ranges and subranges therebetween. In other examples, the layer 30 may be up to about 50 nm thick, or in other examples even up to about 100 nm to about 250 nm thick. The coating layer 30 may be considered to be disposed between sheet 10 and sheet 20 even though it may not contact one or the other of sheet 10 and sheet 20. In other examples, the coating layer 30 modifies the ability of the bonding surface 14 to bond with bonding surface 24, thereby controlling the strength of the bond between the sheet 10 and sheet 20. The material and thickness of the coating layer 30, as well as the treatment of the bonding surfaces 14, 24 prior to bonding, can be used to control the strength of the bond (energy of adhesion) between sheet 10 and sheet 20.

Coating Layer Composition

Examples of coating layers include hydrocarbon polymers. Preferably, the hydrocarbon polymers are hydrogenated amorphous hydrocarbon polymers. Such hydrocarbon polymers may be formed by depositing a hydrocarbon precursor compound on either the first sheet (for example a carrier) or the second sheet (for example a thin sheet).

One group of hydrocarbon precursor compounds are compounds of formula $C_nH_y$, wherein n is 1 to 6 and y is 2 to 14. In some examples, n is 1 to 4 and y is 2 to 10. The hydrocarbon compounds can be linear or branched. In some examples, the coating layer formed by depositing a hydrocarbon precursor compound has a combined carbon and hydrogen content of at least 80 weight percent, at least 85 weight percent, at least 90 weight percent, or at least 95 weight percent. In some examples, the precursor compound is deposited to form the coating layer has a combined carbon and hydrogen content of at least 80 weight percent, at least 85 weight percent, at least 90 weight percent, at least 95 weight percent, at least 98 weight percent, at least 99 weight percent, or greater than 99.5 weight percent.

Examples of hydrocarbon precursor compounds include alkanes. An alkane can include methane, ethane, propane, butane, pentane and hexane. In some examples, the hydrocarbon precursor compounds include at least one carbon-carbon double bond, for example, an alkene. An alkene can include ethylene, propylene, butylene, pentene and hexene. The carbon-carbon double bond in the alkene can be present at various positions in the compound, for instance, but-1-ene or but-2-ene. In yet other examples, the hydrocarbon precursor compounds includes at least one carbon-carbon triple bond, for example, an alkyne. An alkyne can include ethyne, propyne, butyne, pentyne and hexyne. In some examples, the carbon-carbon triple bond in the alkyne is present at various positions in the compound, for instance, 1-butyne or 2-butyne.

The coating layer can comprise a single layer. The coating layer preferably has a thickness of less than 50 nm, for example less than about 40 nm, less than about 30 nm, less than about 20 nm, less than about 15 nm, less than about 12 nm, less than about 10 nm, less than about 8 nm, less than about 5 nm.

The coating layer is preferably a hydrogenated amorphous plasma-polymerized hydrocarbon compound having certain properties. Optical properties of the coating were obtained from spectroscopic ellipsometry data, by the Tauc-Lorentz model (J. Tauc, R. Grigorovici, A. Vancu, "Optical properties and electronic structure of amorphous germanium," Phys. Status Solidi B, 15 (1966)). In some examples, the coating layer has a refractive index in the range of about 1.8 to about 2.5, for example in a range of about 1.9 to about 2.4, or equal to or greater than about 2, or equal to or greater than about 2.1, or equal to or greater than about 2.2, or equal to or greater than about 2.3. The refractive index of hydrogenated amorphous plasma-polymerized hydrocarbon coating layers on carrier sheets was determined using a Wollam variable angle spectroscopic ellipsometer. The refractive index was determined at 20° C. for light having a wavelength of 632 nm. In another embodiment, the coating layer may have one or more optoelectronic properties. These optoelectronic properties may result from a small band gap ranging from about 0.8 eV to less than about 2 eV, for example ranging from about 1.2 eV to about 1.8 eV or about 1.4 eV to about 1.6 eV. Optoelectronic properties may, for example, include the absorption, transmission, or emission of light.

In some examples, the coating layer is characterized by Raman spectroscopy. In amorphous diamond-like carbon thin films Raman spectroscopy is a preferred method for determining film characteristics, for example, Raman spectra of the films show two distinct peaks. The Raman spectrum can include a G-band peak and a defect band or D-band peak. For 532 nm excitation, the G-band peak may be at about 1530 to about 1600 $cm^{-1}$ and the D-band peak may be at about 1350 to about 1400 $cm^{-1}$. In one example, the D-band peak can be at about 1375 $cm^{-1}$ to about 1380 $cm^{-1}$ and the G-band peak can be at about 1530 $cm^{-1}$ to about 1535 $cm^{-1}$ at 532 nm excitation. In another example, the D-band peak can be at 1378 $cm^{-1}$ and the G-band peak can be at 1533 $cm^{-1}$ at 532 nm excitation.

The parameters of the G-band peak and D-band peak, for example, position, width and intensity ratio, can be used for the characterization of the coating layer compound. The G-band may have a G-band magnitude equal to an intensity of the G-band peak (IG) and the D-band may have a D-band magnitude equal to an intensity of the D-band peak (ID). A ratio of the D-band magnitude to the G-band magnitude (ID/IG or D/G) may be determined therefrom, which is equal to the Raman Graphitization Ratio of a material. In some examples, the D/G ratio of the coating layer can be in the range of about 0.5 to about 0.6, about 0.52 to about 0.58, or about 0.54 to about 0.56.

Deposition of the Coating Layer

Examples of coating methods, for providing a coating layer 30, include chemical vapor deposition (CVD) techniques, and like methods. Specific examples of CVD techniques include CVD, low pressure CVD, atmospheric pressure CVD, Plasma Enhanced CVD (PECVD), atmospheric plasma CVD, atomic layer deposition (ALD), plasma ALD, and chemical beam epitaxy. In another example, the coating layer can be deposited by a pyrolytic torch at temperatures above 600° C., above 800° C., or above 1,000° C., including any ranges and subranges therebetween.

A gas mixture for forming the coating layer, which contains the hydrocarbon compound, may also comprise a controlled amount of another compound, for example, a carrier gas or working gas. The other compound can include air, oxygen, nitrous oxide, carbon dioxide, water vapor, or hydrogen peroxide, and/or one or more an inert gas, for example, helium, neon, argon, krypton, xenon.

Surface Energy of the Coating Layer

The coating layer can provide a bonding surface with a surface energy in a range of from about 48 to about 75 $mJ/m^2$, as measured for one surface (including polar and dispersion components).

In general, the surface energy of the coating layer can be measured upon being deposited and/or after having been further treated, for example by activation with nitrogen or a mixture of nitrogen and oxygen. The surface energy of the as-deposited coating layer prior to any further surface activation step, is in the range of about 48 to about 60 $mJ/m^2$, or about 50 to about 58 $mJ/m^2$, or equal to or greater than about 50 $mJ/m^2$, or equal to or less than about 60 $mJ/m^2$. After further treatment, for example, the surface energy can be increased to about 75 $mJ/m^2$ or less, which provides a good self-propagating bond with a glass sheet, whereby production time to assemble articles is made reasonable and cost efficient. Both surface energy ranges (as-deposited—meaning after deposition of the layer and without any further treatments applied to the layer—and after having been further treated) can also be effective to control bonding at high temperatures so as to prevent two articles from becoming permanently bonded to one another.

The surface energy of the solid surface is measured indirectly by measuring the static contact angles of three liquids—water, diiodomethane and hexadecane—individually deposited on the solid surface in air. Surface energies as disclosed herein were determined according to the Wu model, as set forth below. (See: S. Wu, J. Polym. Sci. C, 34, 19, 1971). In the Wu model, the surface energies, including total, polar, and dispersion components, are measured by fitting a theoretical model to three contact angles of three test liquids: water, diiodomethane and hexadecane. From the contact angle values of the three liquids, a regression analysis is done to calculate the polar and dispersion components of the solid surface energy. The theoretical model used to calculate the surface energy values includes the following three independent equations relating the three contact angle values of the three liquids and the dispersion and polar components of surface energies of the solid surface (denoted by the subscript "S") as well as the three test liquids:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (1)$$

$$\gamma_D(1+\cos\theta_D) = 4\left(\frac{\gamma_D^d \gamma_S^d}{\gamma_D^d + \gamma_S^d} + \frac{\gamma_D^p \gamma_S^p}{\gamma_D^p + \gamma_S^p}\right) \quad (2)$$

$$\gamma_H(1+\cos\theta_H) = 4\left(\frac{\gamma_H^d \gamma_S^d}{\gamma_H^d + \gamma_S^d} + \frac{\gamma_H^p \gamma_S^p}{\gamma_H^p + \gamma_S^p}\right) \quad (3)$$

where, the subscripts "W", "D" and "H" represent water, diiodomethane and hexadecane, respectively, and the superscripts "d" and "p" represent the dispersion and polar components of surface energies, respectively. Since diiodomethane and hexadecane are essentially non-polar liquids, the above set of equations reduces to:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (4)$$

$$\gamma_D(1+\cos\theta_D) = 4\left(\frac{\gamma_D^d \gamma_S^d}{\gamma_D^d + \gamma_S^d}\right) \quad (5)$$

$$\gamma_H(1+\cos\theta_H) = 4\left(\frac{\gamma_H^d \gamma_S^d}{\gamma_H^d + \gamma_S^d}\right) \quad (6)$$

From the above set of three equations (4-6), the two unknown parameters, dispersion and polar surface energy components of the solid surface, $\gamma_s^d$ and $\gamma_s^p$, can be calculated by regression analysis. However, with this approach, there is a limiting maximum value up to which the surface energy of the solid surface could be measured. That limiting maximum value is the surface tension of water, which is about 73 mJ/m$^2$. If the surface energy of the solid surface is appreciably greater than the surface tension of water, the surface will be fully wetted by water, thereby causing the contact angle to approach zero. Beyond this value of surface energy, therefore, all calculated surface energy values would correspond to about 73-75 mJ/m$^2$ regardless of the real surface energy value. For example, if the real surface energies of two solid surfaces are 75 mJ/m$^2$ and 150 mJ/m$^2$, the calculated values using the liquid contact angles will be about 75 mJ/m$^2$ for both surfaces.

Accordingly, all contact angles disclosed herein are measured by placing liquid droplets on the solid surface in air and measuring the angle between the solid surface and the liquid-air interface at the contact line. Therefore, when a claim is made on the surface energy value being from 55 mJ/m$^2$ to 75 mJ/m$^2$ it should be understood that these values correspond to calculated surface energy values based on the method described above and not the real surface energy values, which could be greater than 75 mJ/m$^2$ when the calculated value approaches the real surface energy value.

Surface Activation of the Coating Layer

The desired surface energy for bonding may not be achieved by the surface energy of the initially deposited hydrocarbon coating layer. Thus, the deposited coating layer may be optionally further treated. For example, after the coating layer 30 is deposited, one or more functional groups can optionally be added to add additional bonding capabilities to the coating layer. For example, adding the functional group can provide an additional site of bonding between the coating layer and the second sheet 20. The functional group can be added using plasma, for example atmospheric or low pressure plasma. The functional group is preferably polar, and can be added using a precursor for example hydrogen, carbon dioxide, nitrogen, nitrous oxide, ammonia, acrylic acid, allyl amine, allyl alcohol, or mixtures thereof.

Bonding Energy of the First Sheet or Second Sheet to the Coating Layer

In general, the energy of adhesion (i.e., bond energy) between two surfaces can be measured by a double cantilever beam method or wedge test. The tests simulate in a qualitative manner the forces and effects on an adhesive bond join at a coating layer/first sheet or second sheet interface. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge.

A summary of the test method for determining bond energies as disclosed herein, based on the above-noted ASTM methods, includes recording the temperature and relative humidity under which the testing is conducted, for example, that in a lab room. The second sheet is gently pre-cracked or separated at a corner of the glass article to break the bond between the first sheet and the second sheet. A razor blade is used to pre-crack the second sheet from the first sheet, for example, a GEM brand razor with a thickness of about 228±20 microns. In forming the pre-crack, momentary sustained pressure may be needed to fatigue the bond. A flat razor having the aluminum tab removed is slowly inserted until the crack front can be observed to propagate such that the crack and separation increases. The flat razor does not need to be inserted significantly to induce a crack. Once a crack is formed, the glass article is permitted to rest for at least 5 minutes to allow the crack to stabilize. Longer rest times may be needed for high humidity environments, for example, above 50% relative humidity.

The glass article with the developed crack is evaluated with a microscope to record the crack length. The crack length is measured from the end separation point of the second sheet from the first sheet (i.e. furthest separation point from the tip of razor) and the closest non-tapered portion of the razor. The crack length is recorded and used in the following equation to calculate bond energy.

$$\gamma = 3t_b^2 E_1 t_{w1}^3 E_2 t_{w2}^3 / 16 L^4 (E_1 t_{w1}^3 + E_2 t_{w2}^3) \quad (7)$$

wherein $\gamma$ represents the bond energy $_b$ represents the thickness of the blade, razor or wedge, $E_1$ represents the Young's modulus of the first sheet 10 (e.g., a glass carrier), $t_{w1}$ represents the thickness of the first sheet, $E_2$ represents the Young's modulus of the second sheet 20 (e.g., a thin glass sheet), $t_{w2}$ represents the thickness of the second sheet 20 and L represents the crack length between the first sheet 10 and second sheet 20 upon insertion of the razor blade as described above.

The bond energy is understood to behave as in silicon wafer bonding, where an initially hydrogen bonded pair of wafers are heated to convert much or all the silanol-silanol hydrogen bonds to Si—O—Si covalent bonds. While the initial, room temperature, hydrogen bonding produces bond energies on the order of about 100-200 mJ/m$^2$ which allows separation of the bonded surfaces, a fully covalently bonded wafer pair as achieved during processing on the order of 400 to 800° C. has an adhesion energy of about 2000-3000 mJ/m$^2$ which does not allow separation of the bonded surfaces; instead, the two wafers act as a monolith. On the other hand, if both the surfaces are perfectly coated with a low surface energy material, for example a fluoropolymer, with a thickness large enough to shield the effect of the underlying substrate, the adhesion energy would be that of the coating material and would be very low leading to low or no adhesion between the bonding surfaces. Accordingly, the second sheet 20 (for example a thin glass sheet) would not be able to be processed on first sheet 10 (for example a carrier) without failure of the bond and potential damage to the second sheet 20. Consider two extreme cases: (a) two standard clean 1 (SC1, as known in the art) cleaned glass surfaces saturated with silanol groups bonded together at room temperature via hydrogen bonding (whereby the adhesion energy is about 100-200 mJ/m$^2$) followed by heating to a temperature that converts the silanol groups to covalent Si—O—Si bonds (whereby the adhesion energy becomes 2000-3000 mJ/m$^2$). This latter adhesion energy is too high for the pair of glass surfaces to be detachable; and (b) two glass surfaces perfectly coated with a fluoropolymer with low surface adhesion energy (about 12-20 mJ/m$^2$ per surface) bonded at room temperature and heated to high temperature. In this latter case (b), not only do the surfaces not bond at low temperature (because the total adhesion energy of about 24-40 mJ/m$^2$, when the surfaces are put together, is too low), they do not bond at high temperature either as there are too few polar reacting groups. Between these two extremes, a range of adhesion energies exist, for example between 50-1000 mJ/m$^2$, which can produce the desired degree of controlled bonding. Accordingly, the inventors have found various methods of providing a coating layer leading to a bonding energy between these two extremes, and such that there can be produced a controlled bonding sufficient to maintain a pair of sheets (for example a glass carrier and a thin glass sheet) bonded to one another through the rigors of FPD processing but also of a degree that (even after high temperature processing of, e.g. ≥400° C.≥500° C. and up to at least 600° C.) allows the detachment of the first sheet (e.g., a carrier) from the second sheet (e.g. a thin sheet) after processing is complete. Moreover, the detachment of the first sheet from the second sheet can be performed by mechanical forces, and in such a manner that there is no significant damage to at least the first sheet, and preferably also so that there is no significant damage to the second sheet.

An appropriate bonding energy can be achieved by using select surface modifiers, i.e., coating layer, and/or thermal or nitrogen treatment of the surfaces prior to bonding. The appropriate bonding energy may be attained by the choice of chemical modifiers of either one or both of bonding surface 14 and bonding surface 24, which chemical modifiers control both the van der Waal (and/or hydrogen bonding, as these terms are used interchangeably throughout the specification) adhesion energy as well as the likely covalent bonding adhesion energy resulting from high temperature processing (e.g., on the order of ≥400° C., ≥500° C. and up to at least 600° C.).

In some examples, the coating layer can have a bonding surface bonded to the first or second sheets with bond energy of equal to or less than 700 mJ/m$^2$, equal to or less than 650 mJ/m$^2$, equal to or less 600 mJ/m$^2$, equal to or less 550 mJ/m$^2$, or equal to or less than 500 mJ/m$^2$, including any ranges and subranges therebetween, after holding the article in a furnace at a temperature of 500° C., 550° C., 600° C. or 650° C., including any ranges and subranges therebetween, for 10 minutes in an inert gas (e.g., nitrogen) atmosphere. Bond energy as used herein is measured after placing an article in a furnace chamber, heating the furnace at a rate of 9° C. per minute to the test temperature (e.g., 600° C.), holding the article at the test temperature for a period of 10 minutes, preferably in an inert atmosphere (e.g., nitrogen), cooling the chamber of the furnace to about 200° C. over a period of time of about 1 minute, and then removing the article from the furnace chamber and allowing it to cool to room temperature. This process of testing the articles can also be referred to as subjecting the articles to a thermal test cycle.

Production of the Article

In order to produce the article, for example a glass article, the coating layer 30 is formed on one of the sheets, preferably the first sheet 10 (for example, a carrier). If desired, the coating layer 30 can be subjected to steps such as surface activation, and optionally also annealing, in order to increase the surface energy, decrease outgassing during processing and improve the bonding capabilities of the coating layer 30, as described herein. In order to bond the other sheet, for example second sheet 20, the other sheet is brought into contact with the coating layer 30. If the coating layer 30 has a high enough surface energy, introducing the other sheet to the coating layer 30 will result in the other sheet being bonded to the coating layer 30 via a self-propagating bond. Self-propagating bonds are advantageous in reducing assembly time and/or cost. However, if a self-propagating bond does not result, the other sheet can be bonded to the coating layer 30 using additional techniques, such as lamination, for example by pressing the sheets together with rollers, or by other techniques, as known in the lamination art for bringing two pieces of material together for bonding.

Outgassing of the Coating Layer

Polymer adhesives used in typical wafer bonding applications are generally 10-100 μm thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of about 10 to about 100 nm thick or less, for example the plasma-polymerized coating layers described above, as well as for a thin layer of pyrolyzed silicone oil. For such materials, mass-spectrometry is not sensitive enough. There are a number of other ways to measure outgassing, however.

TEST #1 of measuring small amounts of outgassing is based on an assembled article, i.e., one in which a thin glass sheet is bonded to a glass carrier via a coating layer to be tested, and uses a change in percent bubble or bubble area to determine outgassing. During heating of the glass article, bubbles formed between the carrier and the thin sheet that indicate outgassing of the coating layer. The outgassing under the thin sheet may be limited by strong adhesion between the thin sheet and carrier. Nonetheless, layers ≤10 nm thick (plasma-polymerized materials, for example) may still create bubbles during thermal treatment, despite their smaller absolute mass loss. And the creation of bubbles between the thin sheet and carrier may cause problems with pattern generation, photolithography processing, and/or alignment during device processing onto the thin sheet. Additionally, bubbling at the boundary of the bonded area between the thin sheet and the carrier may cause problems with process fluids from one process entering a bubble in that one process, and leaving the bubble in a downstream process thus contaminating that downstream process. A change in percent bubble area of ≥10 or ≥5 is significant, indicative of outgassing, and is not desirable. On the other hand a change in percent bubble area of ≤3 or ≤1 is insignificant and an indication that there has been no outgassing.

The average bubble area of bonded glass sheets in a class 1000 clean room with manual bonding is about 1%. The percent of bubbles in bonded sheets is a function of cleanliness of the first sheet, the second sheet, and surface preparation. Because these initial defects act as nucleation sites for bubble growth after heat treatment, any change in bubble area upon heat treatment less than about 1% is within the variability of sample preparation. To carry out this test, a commercially available desktop scanner with transparency unit (Epson Expression 10000XL Photo) was used to make a first scan image of the area bonding the first sheet and the second sheet immediately after bonding. The articles were scanned using the standard Epson software using 508 dpi (50 μm/pixel) and 24 bit RGB. The image processing software first prepares an image by stitching, as necessary, images of different sections of a sample into a single image and removing scanner artifacts (by using a calibration reference scan performed without a sample in the scanner). The bonded area is then analyzed using standard image processing techniques, for example thresholding, hole filling, erosion/dilation, and blob analysis. The Epson Expression 11000XL Photo may also be used in a similar manner. In transmission mode, bubbles in the bonding area are visible in the scanned image and a value for bubble area can be determined. Then, the bubble area is compared to the total bonding area (i.e., the total overlap area between the thin sheet and the carrier) to calculate a percent area of the bubbles in the bonding area relative to the total bonding area. The samples are then heat treated in a MPT-RTP600s Rapid Thermal Processing system, available from Modular Process Technology (MPT, with offices in San Jose, CA) under $N_2$ atmosphere at test-limit temperatures of 300° C., 400° C., 500° C. and 600° C., for up to 10 minutes. Specifically, the time-temperature cycle carried out included: inserting the article into the heating chamber at room temperature and atmospheric pressure; the chamber was then heated to the test-limit temperature at a rate of 9° C. per minute; the chamber was held at the test-limit temperature for 10 minutes; the chamber was then cooled at furnace rate over about 1 minute to about 200° C.; the article was removed from the chamber and allowed to cool to room temperature; the article was then scanned a second time with the optical scanner. The percent bubble area from the second scan was then calculated as above and compared with the percent bubble area from the first scan to determine a change in percent bubble area. As noted above, a change in bubble area of ≥10% is significant and an indication of outgassing. A change in percent bubble area was selected as the measurement criterion because of the variability in original percent bubble area. That is, most coating layers have a bubble area of about 2% in the first scan due to handling and cleanliness after the thin sheet and carrier have been prepared and before they are bonded. However, variations may occur between materials.

The percent bubble area measured, as exemplified by the change in percent bubble area, can also be characterized as the percent of total surface area of the coating layer bonding surface not in contact with the first sheet bonding surface. As described above, the percent of total surface area of the coating layer bonding surface not in contact with the first sheet is desirably less than 10%, less than 5%, less than 3%, less than 1% and up to less than 0.5% after the glass article is subjected to a temperature cycle by heating in a chamber cycled from room temperature to 500° C., 600° C., 650° C., and up to 700° C., including any ranges and subranges therebetween, at a rate 9° C. per minute and then held at the test temperature for 10 minutes before cooling the chamber to about 200° C. in about 1 minute and removing the article from the chamber and allowing the glass article to cool to room temperature. The coating layer described herein allows the first sheet to be separated from the second sheet without breaking the first sheet into two or more pieces after the glass article is subjected to the above temperature cycling and thermal testing.

Processing of the Glass Article

The use of a coating layer, together with bonding surface preparation as appropriate, can achieve a controlled bonding area, that is, a bonding area capable of providing a room-temperature bond between the first sheet and the second sheet sufficient to allow the article to be processed in FPD type processes (including vacuum and wet processes), and yet one that controls covalent bonding between the first sheet and the second sheet (even at elevated temperatures) so as to allow the first sheet to be removed from the second sheet (without damage to the sheets) after high temperature processing of the article, for example, FPD type processing or LTPS processing. To evaluate potential bonding surface preparations and coating layers with various bonding energies that would provide a reusable carrier suitable for FPD processing, a series of tests were used to evaluate the suitability of each. Different FPD applications have different requirements, but LTPS and Oxide TFT processes appear to be the most stringent at this time. Thus, tests representative of steps in these processes were chosen, as these are desired applications for the article 2. Annealing at 400° C. is used in oxide TFT processes, whereas crystallization and dopant activation steps over 600° C. are used in LTPS processing. Accordingly, the following testing was carried out to evaluate the likelihood that a particular bonding surface preparation and the coating layer would allow a thin sheet to remain bonded to a carrier throughout FPD processing, while allowing the thin sheet to be removed from the carrier (without damaging the thin sheet and/or the carrier) after such processing (including processing at temperatures ≥400° C. and up to less than 700° C.).

EXAMPLES

Example 1

A methane precursor compound was deposited as coating layers on Corning® EAGLE XG® alkali-free display glass having a thickness of about 0.7 mm. Methane at about 1 weight percent of a carrier gas of helium at a rate of 50 to 100 sccm and at room temperature was deposited with a Linear atmospheric pressure plasma head at a power in the range of 400 to 750 Watts and a frequency of 13.56 MHz. A scan speed in the range of 20 to 60 mm per seconds was used to deposit the coating layers and the plasma head was placed away from the display glass at a distance in the range of 10 to 30 mm. The coated carriers were then bonded to clean 100 μm thin glass sheets (made of Corning® Willow® glass). Prior to bonding, the Willow® glass was cleaned in a typical display clean line in 2% Semiclean KG at 65° C. and well rinsed, and cleaned in dilute SC1 (40:1:2 DI:JTB111:$H_2O_2$ (30%) 65° C./10 min.), and spin rinse dried.

Figure 3:
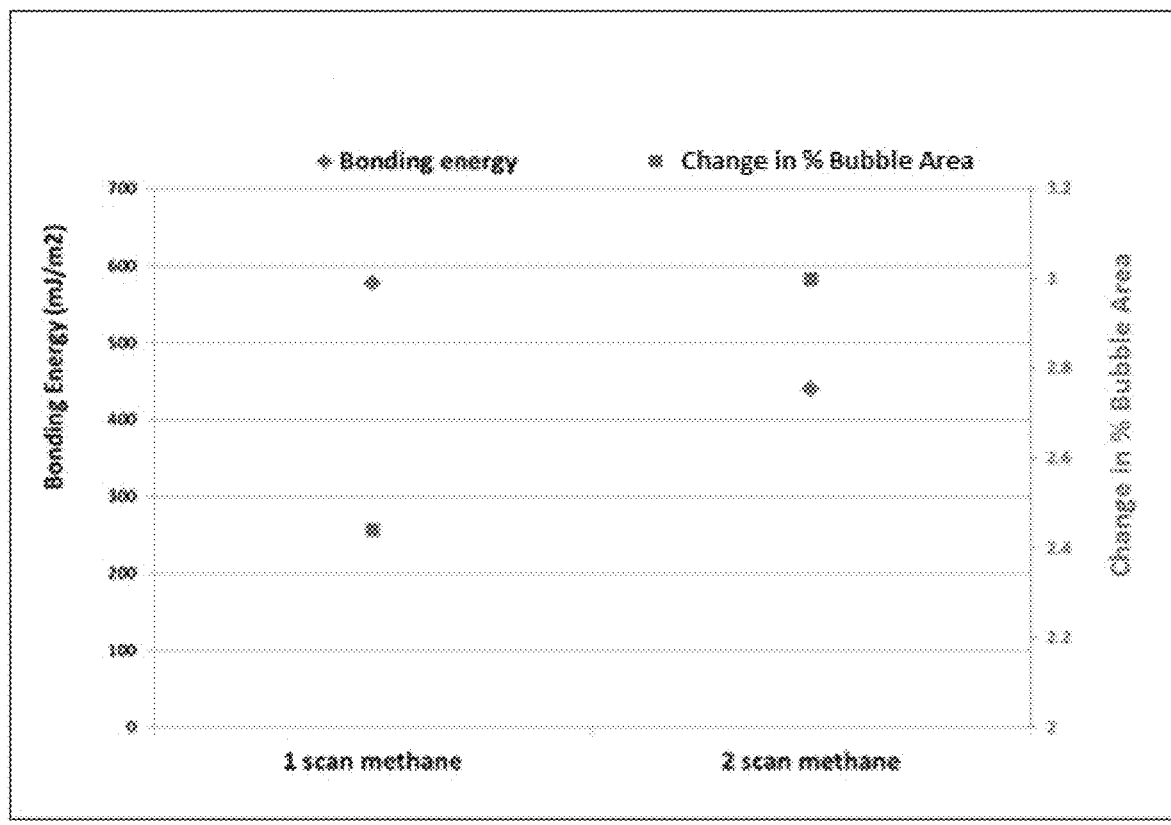
FIG. 3 is a graph of the bond energy and change in percent bubble area for thin glass bonded to a carrier with a hydrogenated amorphous plasma-polymerized hydrocarbon coating layer formed by a methane precursor.

FIG. 3 shows the bond energy (mJ/m$^2$, left-hand Y-axis, filled diamond data points) and outgassing (change in percent bubble area, right-hand Y-axis, filled square data points) of a first glass article including a first methane-based coating layer deposited at 25° C. with a thickness of less than about 3 nm (1 scan), and of a second glass article including a second methane-based coating layer deposited at 25° C. with a thickness of less than about 5 nm (2 scan), and both the first and second glass articles including a thin glass sheet (thickness of 100 microns) coupled to the carrier via the respective coating layer. As deposited, the first and second methane-based coating layers produced a bond energy between the thin glass sheet and the carrier of about 577 mJ/m$^2$ and 439 mJ/m$^2$, respectively, after holding the glass article in a furnace at a temperature of 600° C. for 10 minutes in a nitrogen atmosphere. Bond energy was measured by a wedge insertion method as described above. As deposited, the first and second methane-based coating layers exhibited a change in bubble area of about 2.45% and about 2.95%, respectively, after holding the glass article in a furnace at a temperature of 600° C. for 10 minutes in a nitrogen atmosphere, which is consistent with minimal to no outgassing. Bubble area was determined using TEST #1. As can be seen, as the bond energy decreases, the bubble area increases, indicating that the percent of the surface of the thin glass sheet bonded to the coating layer is decreasing. However, the bubble area is below 5% and this material is useful up to a temperature of at least about 600° C.

The as-deposited measured surface energy was 51.94 mJ/m$^2$ for the 1-scan coating and 44.81 mJ/m$^2$ for the 2-scan coating.

Figure 7:
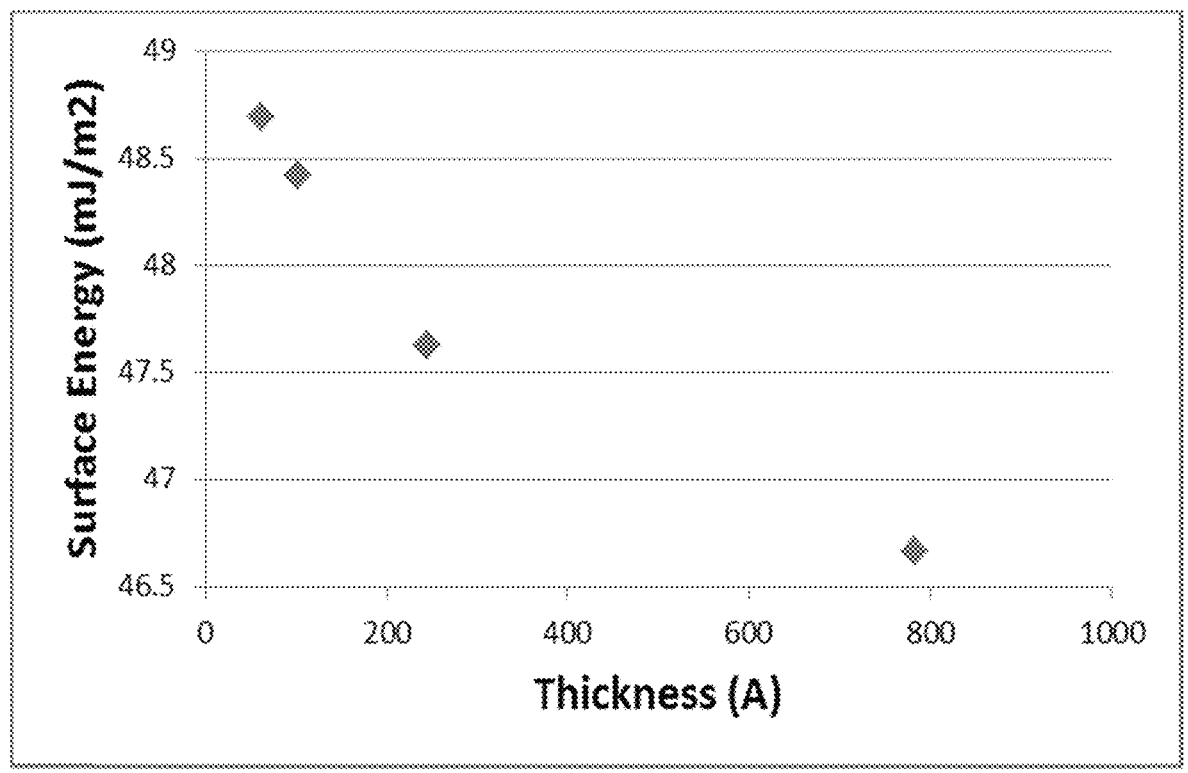
FIG. 7 is a graph of the surface energy for a prior art coating layer formed by a methane precursor.

FIG. 7 shows a comparison of surface energy over a range of coating layer thicknesses for coating layers by depositing methane as disclosed in WO 2015/112958, wherein the surface energies were well below 49 mJ/m$^2$ and decreased significantly as thickness increased.

Optical band gap for the coating layers of Example 1 were measured as about 1.53 eV.

Comparative Example 2

A methane precursor compound was deposited as a coating layer on on Corning® EAGLE XG® alkali-free display glass having a thickness of about 0.7 mm. The coating layer was deposited in a Plasmatherm HDPCVD apparatus using a gas source of 20 standard cubic centimeters per minute (sccm) of $C_2H_4$ and 40 sccm of $H_2$. The coating was deposited for a period of 180 seconds at a chamber pressure of 5 mT, a power of 1500 W and a frequency of 2 kHz applied to the coil, and a frequency of 13.56 MHz applied to the platen.

Coating layers were characterized by contact angle measurements with a Kruss goniometer (available from Kruss GmbH, Hamburg Germany) using water, hexadecane, and diiodomethane fluids and fit using the Wu model. A Wollam spectroscopic ellipsometer (available from J. A. Wollam Co., Lincoln, NE) was used to measure coating layer thickness. The measured thickness of the as-deposited coating was about 782 Angstroms (about 78.2 nm). The as-deposited measured surface energy was 46.7 mJ/m$^2$ for the coating. The measured surface energy was well below the 51.94 mJ/m$^2$ surface energy of the 1-scan coating of Example 1. Optical band gap for the coating layer was measured as about 3.27 eV. The measured optical band gap was well above the 1.53 eV optical band gap of the coatings of Example 1.

Example 3

Plasma-polymerized ethylene coating layers were deposited on 0.7 mm thick EAGLE XG® carriers with a Nextral NE5000 parallel plate reactive ion etch (RIE) machine available from Corial, having headquarters in Bernin, France) using ethylene and hydrogen gas sources. Deposition conditions were a chamber pressure of 30 mT, a power of 500 W, 8 standard cubic centimeters per minute (sccm) of $C_2H_4$ and 92 sccm of $H_2$, and a platen temperature of 40° C. The as-deposited coating layers were then surface activated with a nitrogen and oxygen mixture of 25 sccm $N_2$ 25 sccm $O_2$ 10 mT 500 W. The coated carriers were then bonded to clean 100 μm thin glass sheets (made of Corning® Willow® glass). Prior to bonding, the Willow® glass was cleaned in a typical display clean line in 2% Semiclean KG at 65° C. and well rinsed, and cleaned in dilute SC1 (40:1:2 DI:JTB111:$H_2O_2$ (30%) 65° C./10 min.), and spin rinse dried.

Coating layers were characterized by contact angle measurements with a Kruss goniometer (available from Kruss GmbH, Hamburg Germany) using water, hexadecane, and diiodomethane fluids and fit using the Wu model. A Wollam spectroscopic ellipsometer (available from J. A. Wollam Co., Lincoln, NE) was used to measure coating layer thickness, roughness and dispersion using a Tauc Lorentz model. Index and thickness were also measured with an n&k analyzer using a single F-K oscillator model included with the accompanying software. Bond energy was measured by the wedge insertion method described above.

Figure 4:
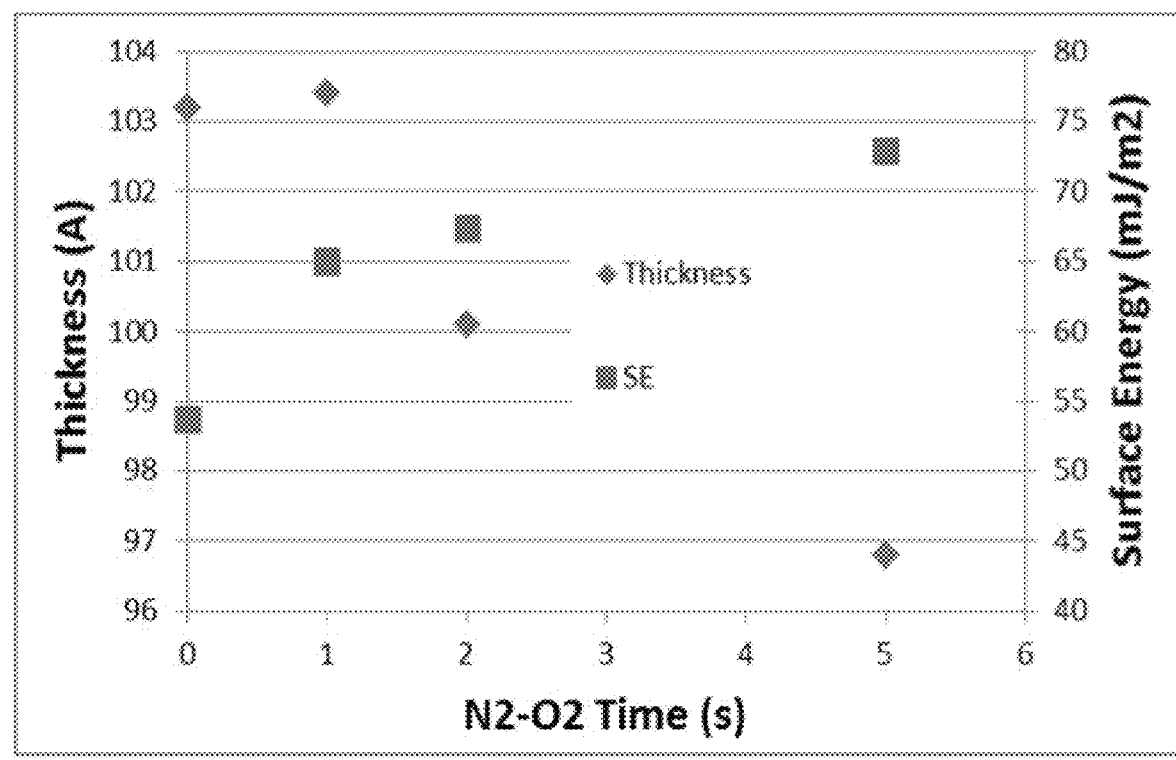
FIG. 4 is a graph of the surface energy before and after surface activation for a hydrogenated amorphous plasma-polymerized hydrocarbon coating layer formed by an ethylene precursor.

FIG. 4 shows the change in surface energy of the coating layer prior to bonding with the thin glass and during activation with the nitrogen and oxygen mixture. In this figure, filled diamond data points are thickness in angstroms ("A") according to the scale on the left-hand Y-axis, and the filled square data points are surface energy in mJ/m$^2$ according to the scale on the right-hand Y-axis. The as-deposited thickness of the coating layer was about 103 Angstrom (about 10.3 nm) and the as-deposited surface energy (at time equals 0) was about 54 mJ/m$^2$. Activation with nitrogen and oxygen for 5 seconds ("s") increased the surface energy to about 72 mJ/m$^2$ and the thickness decreased to about 97 Angstroms (about 9.7 nm). Accordingly, longer $N_2$—$O_2$ exposure times lead to decreased thickness and increased surface energy.

Figure 5:
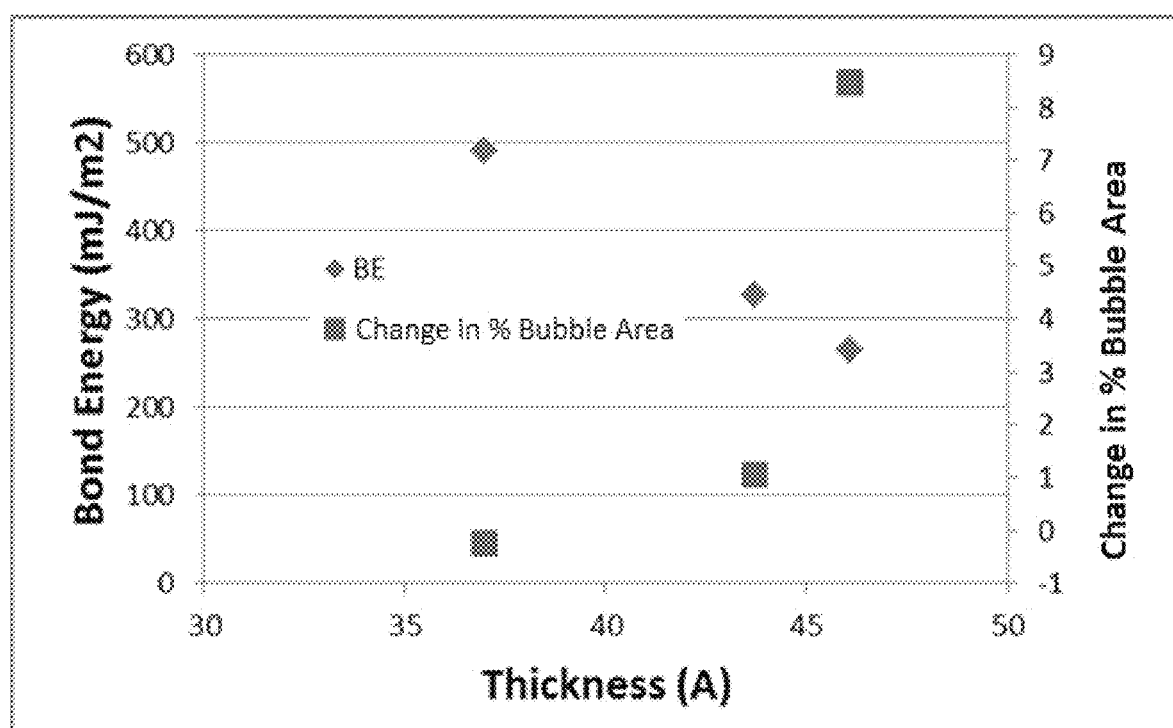
FIG. 5 is a graph of the bond energy and change in percent bubble area for thin glass bonded to a carrier with a hydrogenated amorphous plasma-polymerized hydrocarbon coating layer formed by an ethylene precursor.

FIG. 5 shows the bond energy (mJ/m$^2$, left-hand Y-axis, filled diamond data points) and outgassing (change in percent bubble area, right-hand Y-axis, filled square data points) of a glass articles including ethylene-based coating layers of having thicknesses of about 37 Angstroms (about 3.7 nm), about 44 Angstroms (about 4.4 nm) and about 46 Angstroms (about 4.6 nm). The glass articles were held in a furnace at 500° C. for 10 minutes in a nitrogen atmosphere. The furnace was heated at a rate of 9° C. per minute to the 500° C. test temperature and after 10 minutes at the test temperature the furnace was cooled to about 200° C. in about 1 minute, and then the glass article was removed and allowed to cool to room temperature. The coating layers produced a bond energy of about 500 mJ/m$^2$ at a layer thickness of about 3.7 nm, about 325 mJ/m$^2$ at a layer thickness of about 4.4 nm and about 275 mJ/m$^2$ at a layer thickness of about 4.6 nm. The coating layers exhibited a bubble area change of about 0% at a layer thickness of about 3.7 nm, about 1% at a layer thickness of about 4.4 nm and about 8.5% at a layer thickness of about 4.6 nm; wherein all of these changes in percent bubble area are consistent with no outgassing. Coating layers having a thickness in the range of about 3.5 nm to about 4.5 nm provided an advantageous combination of bonding energy (high enough to allow the articles to be processed in display making processes without coming apart and yet low enough after the desired heat treatment to allow the sheets to separate without breaking) and low outgassing (as measured by bubble area change) to avoid process contamination.

Figure 6:
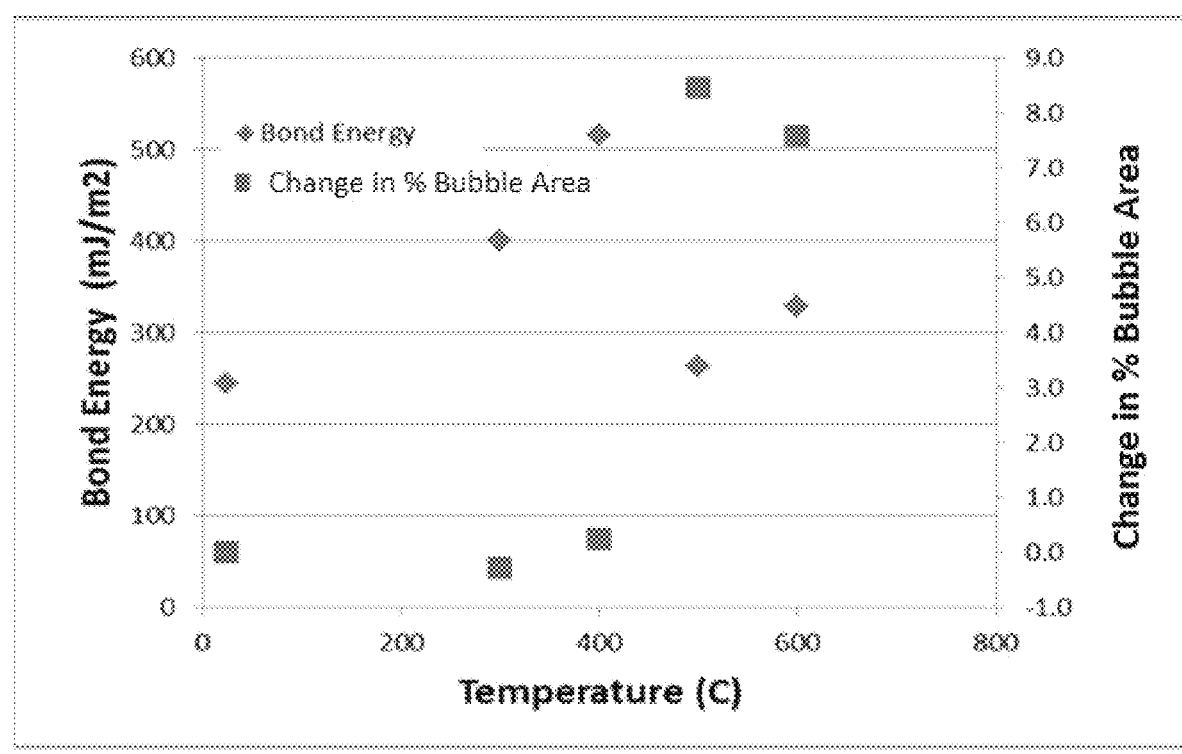
FIG. 6 is a graph of the bond energy and change in percent bubble area for thin glass bonded to a carrier with a hydrogenated amorphous plasma-polymerized hydrocarbon coating layer formed by an ethylene precursor.

FIG. 6 shows the bond energy (mJ/m$^2$, left-hand Y-axis, filled diamond data points) and outgassing (change in percent bubble area, right-hand Y-axis, filled square data points) of glass articles including ethylene-based coating layers over a range of temperatures. The glass articles were held at each specified temperature for 10 minutes in a nitrogen atmosphere and the coating layers had a thickness of about 44 Angstroms (about 4.4 nm). The coating layers produced a bond energy of about 250 mJ/m² at a temperature of about 25° C. (room temperature), about 400 mJ/m² after a thermal test cycle to a temperature of about 300° C., about 515 mJ/m² after a thermal test cycle to a temperature of about 400° C., about 270 mJ/m² after a thermal test cycle to a temperature of about 500° C., and about 320 mJ/m² after a thermal test cycle to a temperature of about 600° C.; all of these bond energies are within the range allowing the sheets to be separated without damage. The coating layers exhibited a bubble area change of about 0% at a temperature of about 25° C., about 0% at a temperature of about 300° C., about 0% at a temperature of about 400° C., about 8.5% at a temperature of about 500° C., and about 7.5% at a temperature of about 600° C., wherein all of these changes in percent bubble area are consistent with no outgassing.

Figure 8:
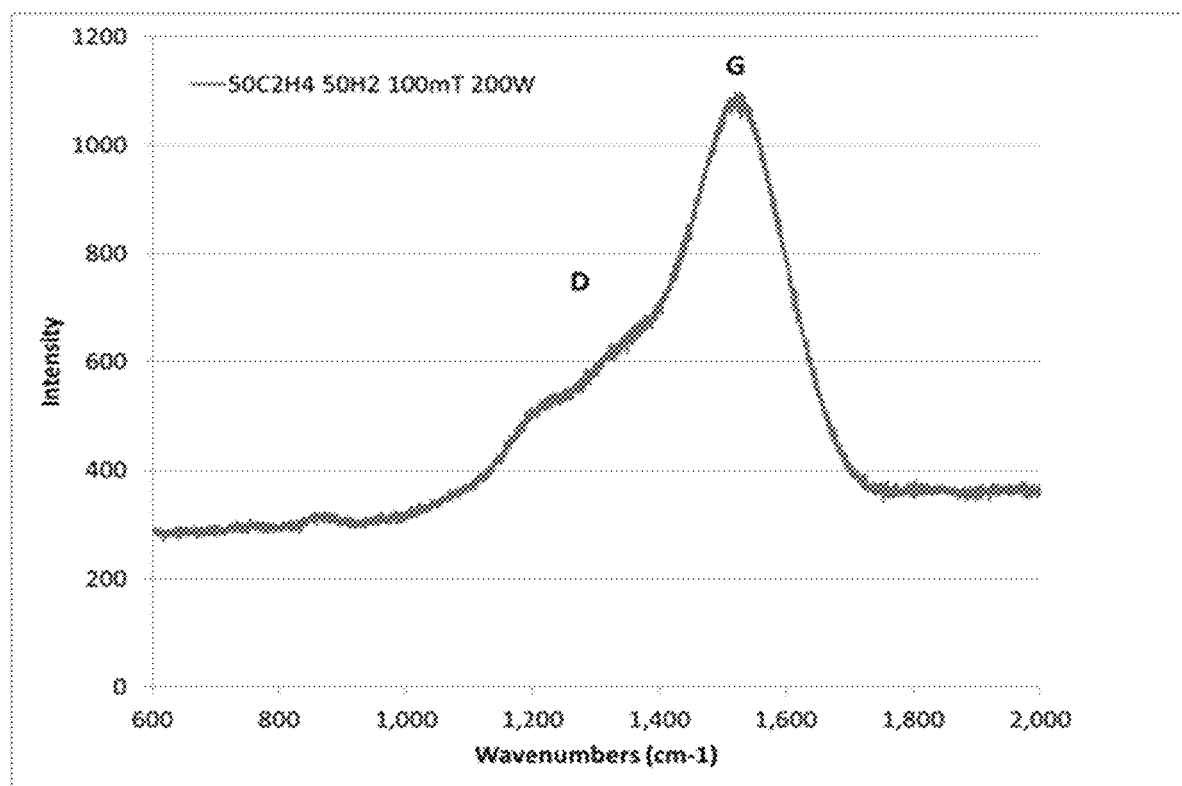
FIG. 8 is a graph of Raman characterization of a hydrogenated amorphous plasma-polymerized hydrocarbon coating layer formed by an ethylene precursor.

FIG. 8 shows a graph of Raman characterization of a hydrogenated amorphous plasma-polymerized hydrocarbon coating layer formed by an ethylene precursor of this Example. The coating layer composition exhibits a D-band peak at 1378 cm⁻¹ and a G-band peak at 1533 cm⁻¹ at 532 nm excitation and demonstrates that the coating is a hydrogenated amorphous carbon material. The ID/IG ratio for the coating layer is 0.55, which is indicative of a diamond-like carbon (DLC) film.

It will be apparent to those skilled in the art that various modifications and variations can be made to the examples disclosed herein without departing from the spirit and scope of the claimed subject matter. Many variations and modifications may be made to the above-described examples without departing substantially from the spirit and various principles described. All such modifications and variations are intended to be included herein within the scope of this disclosure and protected by the following claims.

What is claimed is:

1. A method of making an article comprising:
    forming a coating layer, onto a first sheet bonding surface of a first sheet, by vapor depositing a precursor compound having a hydrogen and carbon content of greater than 90 weight percent; and
    the coating layer comprising a polymerized hydrogenated amorphous hydrocarbon compound and a first coating layer bonding surface and a second coating layer bonding surface; and
    wherein an intensity ratio (D/G ratio) of a peak (D band) appearing in a range of 1350 to 1400 cm⁻¹ to a peak (G band) appearing in a range of 1530 to 1600 cm⁻¹ of a Raman spectrum of the coating layer is in a range of about 0.5 to about 0.6.

2. The method of claim 1, the coating layer is formed by depositing a hydrocarbon compound, the hydrocarbon compound having a formula of $C_nH_y$, wherein n is 1 to 6 and y is 2 to 14.

3. The method of claim 1, further comprising bonding the second coating layer bonding surface with a second sheet bonding surface of a second sheet.

4. The method of claim 3, wherein the first sheet is a glass sheet and/or the second sheet is a glass sheet.

5. The method of claim 1, wherein the hydrocarbon is an alkyne selected from the group consisting of ethyne, propyne, butyne, pentyne and hexyne.

6. The method of claim 1, further comprising increasing the surface energy of the second coating layer bonding surface before the second sheet bonding surface is bonded to the second coating layer bonding surface, wherein the surface energy is increased by exposing the second coating layer bonding surface to oxygen, nitrogen, or a combination thereof.

7. The method of claim 1, the coating layer having an average thickness of less than about 10 nm.

8. The method of claim 1, wherein the vapor deposition is low-pressure plasma chemical vapor deposition or atmospheric pressure plasma chemical vapor deposition.

9. The method of claim 1, the second coating layer bonding surface having an as-deposited surface energy greater than about 50 mJ/m².

10. The method of claim 1, the coating layer having a refractive index above about 2 or an optical band gap less than about 2 eV.

\* \* \* \* \*